United States Patent
Fukata

(10) Patent No.: US 8,938,007 B2
(45) Date of Patent: Jan. 20, 2015

(54) ENCODING APPARATUS, ELECTRONIC DEVICE, IMAGING APPARATUS, AND IMAGING SYSTEM

(75) Inventor: Akitaka Fukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 13/067,126

(22) Filed: May 11, 2011

(65) Prior Publication Data

US 2011/0317765 A1 Dec. 29, 2011

(30) Foreign Application Priority Data

Jun. 28, 2010 (JP) ................. 2010-146439

(51) Int. Cl.
*H04N 7/12* (2006.01)
*H04N 19/42* (2014.01)
*H04N 19/103* (2014.01)
*H04N 19/136* (2014.01)

(52) U.S. Cl.
CPC ....... *H04N 7/26702* (2013.01); *H04N 7/26021* (2013.01); *H04N 7/26122* (2013.01)
USPC ................. 375/240.16; 375/240.24

(58) Field of Classification Search
CPC ......... H04N 7/50; H04N 19/00; G07C 5/0855
See application file for complete search history.

(56) References Cited

U.S. PATENT DOCUMENTS

| | | | | |
|---|---|---|---|---|
| 5,245,427 A | * | 9/1993 | Kunihiro | 348/400.1 |
| 2002/0196854 A1 | * | 12/2002 | Kim | 375/240.17 |
| 2009/0086816 A1 | * | 4/2009 | Leontaris et al. | 375/240.03 |
| 2009/0225193 A1 | * | 9/2009 | Ishii | 348/231.99 |
| 2010/0231736 A1 | * | 9/2010 | Hosokawa | 348/222.1 |

FOREIGN PATENT DOCUMENTS

| | | |
|---|---|---|
| JP | 10-178645 | 6/1998 |
| JP | 2000-261713 | 9/2000 |
| JP | 2001-358984 A | 12/2001 |
| JP | 2003-284076 A | 10/2003 |
| JP | 2005-175974 A | 6/2005 |
| JP | 2009-010612 A | 1/2009 |
| JP | 2009-296104 A | 12/2009 |

OTHER PUBLICATIONS

Japanese Office Action issued Jun. 3, 2014 for corresponding Japanese Application No. 2010-146439.
Japanese Office Action issued Feb. 25, 2014 for corresponding Japanese Application No. 2010-146439.

* cited by examiner

*Primary Examiner* — Joseph Ustaris
*Assistant Examiner* — Zhubing Ren
(74) *Attorney, Agent, or Firm* — Rader, Fishman & Grauer PLLC

(57) ABSTRACT

Disclosed herein is an encoding apparatus including: an encoding execution block configured to encode moving image data in accordance with setting; and a setting block configured to make setting for the encoding execution block to execute the encoding. If an image of the moving image data is darker than usual, the setting block makes the setting so as to decrease a code amount of the darker image of the moving image data, and the encoding execution block encodes the darker image of the moving image data in accordance with the setting for decreasing the code amount of the darker image.

11 Claims, 17 Drawing Sheets

F I G . 7

MODE DECISION TABLE

| FRAME RATE > THRESHOLD | DARK MODE |
|---|---|
| FRAME RATE ≦ THRESHOLD | NORMAL MODE |

FIG.8

| PARAMETER | NOMAL MODE | DARK MODE | CHARACTERISTICS OF DARK MODE |
|---|---|---|---|
| QUANTIZATION TABLE | TBL1 | TBL2 | VALUE OF HIGH FREQUENCY PORTION IS HIGH |
| QUANTIZATION AMOUNT (Qp) | q1 | q2 | VALUE OF HIGH FREQUENCY PORTION IS HIGH ENOUGH |
| INTER-FRAME MOTION VECTOR SEARCH | PRESENT | NOT FIXED (VARIABLE) | |
| ENCODING REPETITION | ABSENT | PRESENT | UNTIL OPTIMUM CODE AMOUNT AND PICTURE QUALITY ARE OBTAINED |
| INTRA/INTER SWITCHING | ABSENT | PRESENT | SWITCH FROM INTRA TO INTER WHEN FRAME RATE IS LOW |
| INTRA-FRAME FIXING | ABSENT | PRESENT | ENCODE ALL FRAMES IN GOP INTO INTRA FRAMES |
| ENCODED FRAME RATE | FIXED (= NORMAL IMAGING FRAME RATE) | NOT FIXED (VARIABLE) | EXECUTE ENCODING PROCESSING ACCORDING TO NEW FRAME DATA INPUT (→ TIME INDICATED BY 1 GOP GETS LONGER) |
| USER DATA | ANY | PRESENT | DARK IMAGE INFORMATION |
| INTRA-FRAME SPECIFICATION AT SWITCHING | ABSENT | PRESENT | PUT FRAME DATA IMMEDIATELY AFTER SETTING CHANGE INTO INTRA FRAME |
| | | ⋮ | |

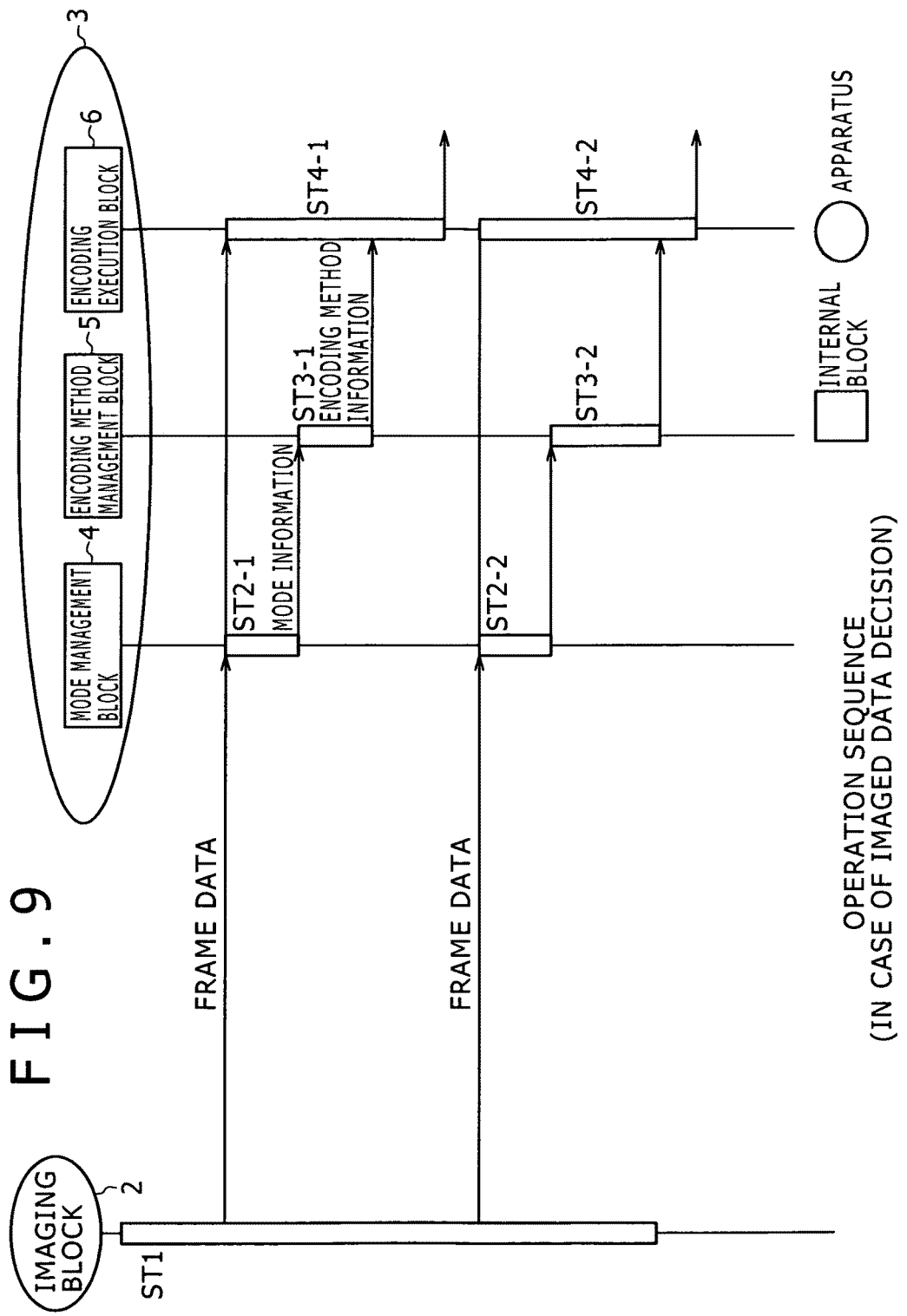

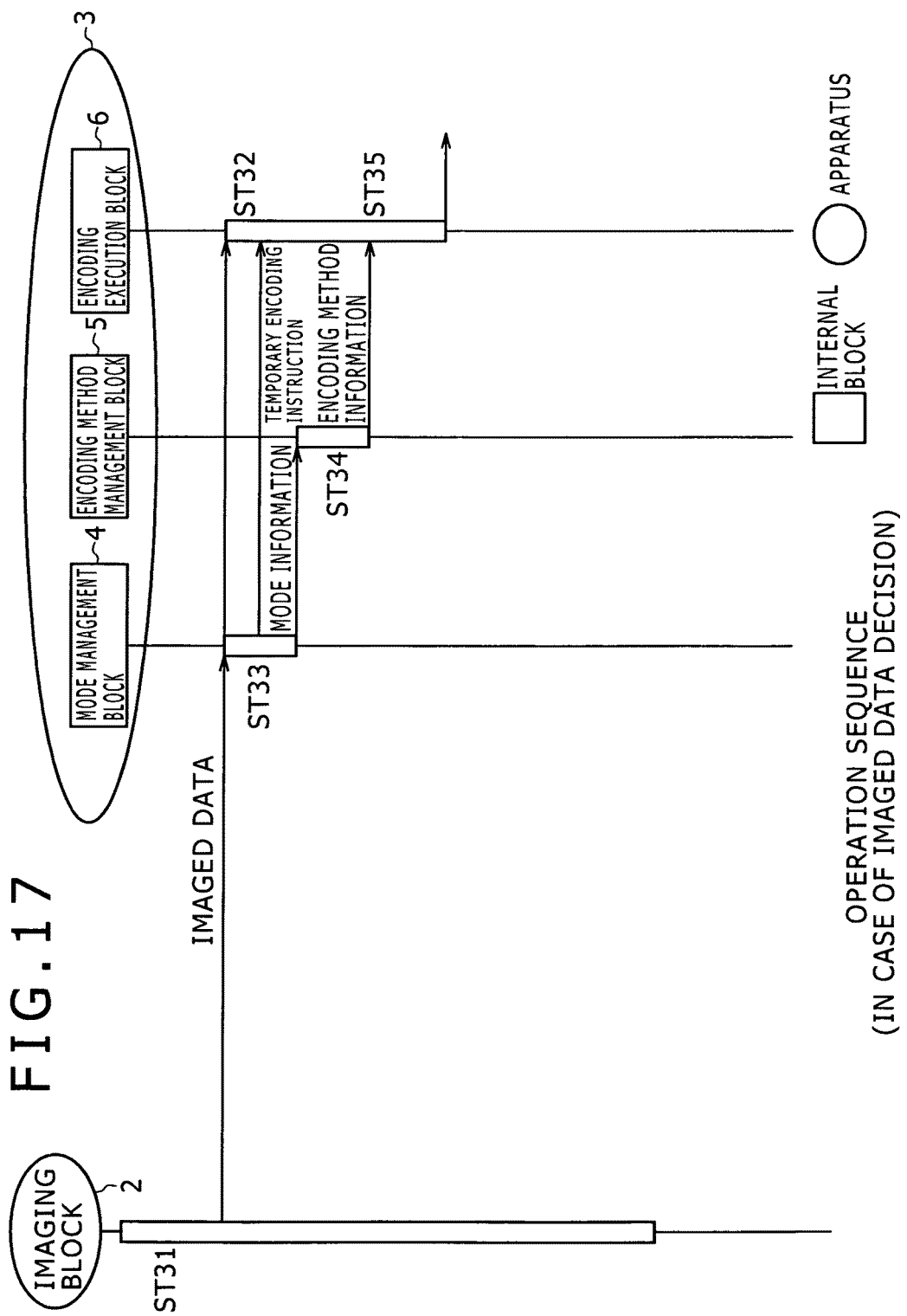

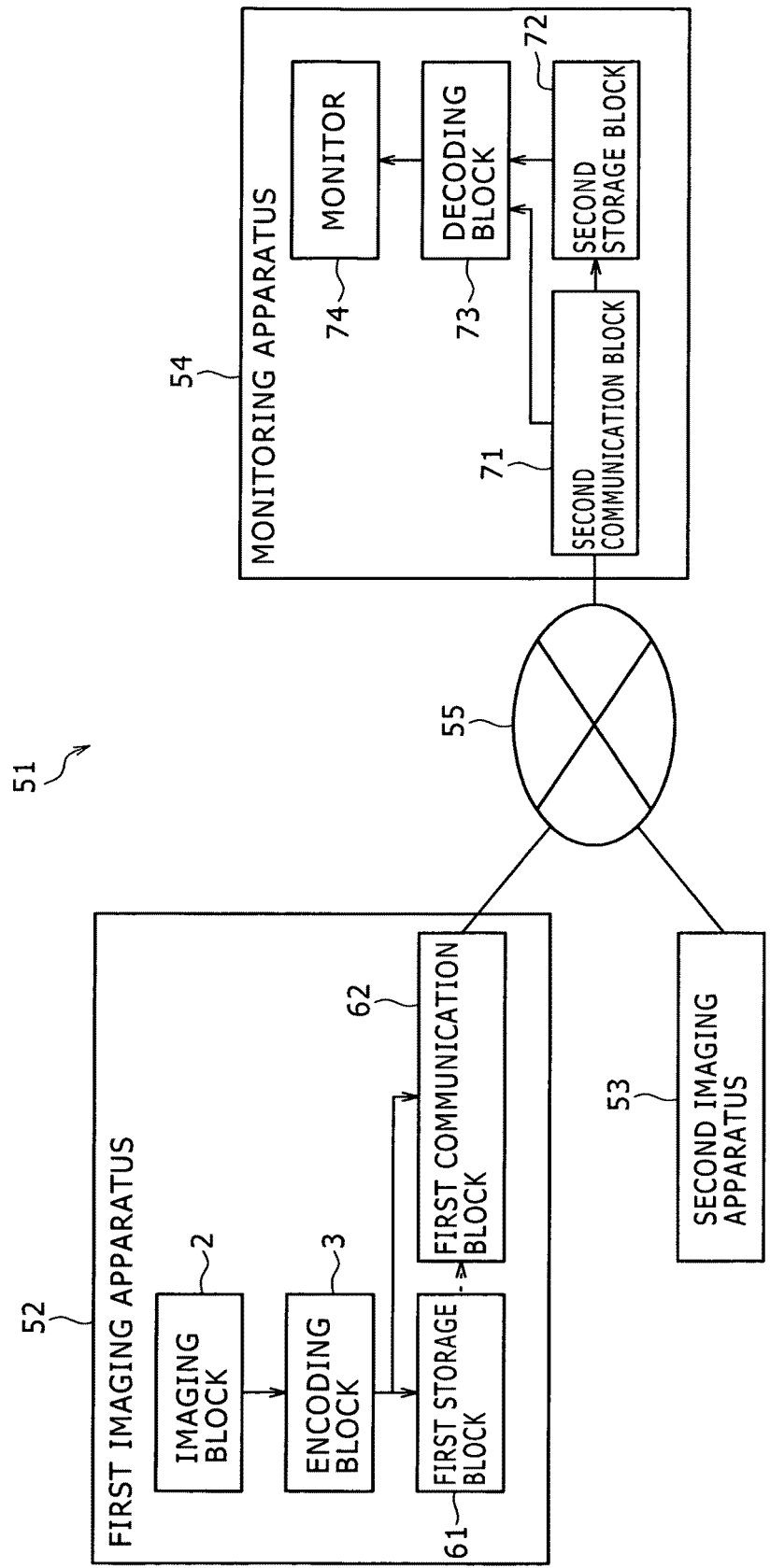

ENCODING APPARATUS, ELECTRONIC DEVICE, IMAGING APPARATUS, AND IMAGING SYSTEM

BACKGROUND

The present disclosure relates to an encoding apparatus for encoding moving image data, an electronic device, an imaging apparatus, and an imaging system.

Imaging systems for encoding moving image data generated by an imaging apparatus of each imaging system includes a monitoring system for example. By encoding moving image data, the monitoring system is able to reduce the data amount of moving image data to be transmitted and the data amount of moving image data to be recorded (refer to Japanese Patent Laid-open No. 2000-261713).

SUMMARY

However, if moving data generated by an imaging apparatus is encoded, the data amount of the encoded moving data may not be preferably reduced depending on imaging environments.

For example, in imaging in the dark, some imaging blocks of monitoring systems for example drop an imaging frame rate so as to secure the exposure time of each image.

If the imaging frame rate is dropped, the frame intervals of dark moving image data that is outputted from the imaging block get wider.

If the encoding apparatus is executing encoding processing at a fixed frame rate, then the same image is encoded two or more times or images that are not encoded are generated.

Encoding the same image two or more times generates wasted encoded data.

Images taken in the dark include many quantized noises due to the insufficient amount of light.

In this case, the code amount resulted from the encoding each moving image data increases.

Especially, if dark images are encoded as an inter-frame by which other images are referenced, the quantization noises included in different images are different from each other, so that the code amount increases by the difference in quantization noise between the images.

The encoding apparatus encodes images in accordance with a standard-compliant encoding scheme, such as MPEG (Moving Picture Experts Group) 1, 2, or 4 or H.264, for example, so that the encoding apparatus adjusts the code amount so as to more reduce the amount of encoded data than the normal case.

Consequently, the picture quality of dark pictures is deteriorated more than that of normal images.

Therefore, the present disclosure addresses the above-identified and other problems associated with related-art methods and apparatuses and solves the addressed problems by providing a coding apparatus, an electronic device, an imaging apparatus, and an imaging system that are configured to suitably encoding dark images.

In carrying out the disclosure and according to a first embodiment thereof, there is provided an encoding apparatus. This encoding apparatus has an encoding execution block configured to encode moving image data in accordance with setting; and a setting block configured to make setting for the encoding execution block to execute the encoding. In this configuration, if an image of the moving image data is darker than usual, the setting block makes the setting so as to decrease a code amount of the darker image of the moving image data, and the encoding execution block encodes the darker image of the moving image data in accordance with the setting for decreasing the code amount of the darker image.

In the first embodiment of the disclosure, if an image of moving image data is darker than usual, then the setting block makes setting such that a code amount of the moving image data is reduced.

The encoding execution block encodes the dark image of the moving image data in accordance with the setting in which the code amount of the dark image is reduced.

Consequently, the code amount of the dark image can be reduced in the first embodiment of the disclosure.

In carrying out the disclosure and according to a second embodiment thereof, there is provided an electronic device. This electronic device has an encoding execution block configured to encode moving image data in accordance with setting; and a setting block configured to execute setting to the encoding execution block. In this configuration, wherein, if an image of the moving image data is darker than usual, the setting block makes setting so as to decrease a code amount of the dark image of the moving image data, and the encoding execution block encodes the dark image of the moving image data in accordance with the setting for decreasing the code amount of the dark image.

In carrying out the disclosure and according to a third embodiment thereof, there is provided an imaging apparatus. This imaging apparatus has an imaging block configured to output a signal including taken moving image data; and an encoding block configured to receive the signal from the imaging block. The encoding block has an encoding execution block configured to encode moving image data in accordance with setting; and a setting block configured to execute setting to the encoding execution block. In this configuration, if an image of the moving image data is darker than usual, the setting block executes setting so as to decrease a code amount of the dark image of the moving image data, and the encoding execution block encodes the dark image of the moving image data in accordance with the setting for decreasing the code amount of the dark image.

In carrying out the disclosure and according to a fourth embodiment thereof, there is provided an imaging system. This imaging system has an imaging apparatus having an imaging block, an encoding block, and a first communication block, wherein moving image data taken by the imaging block is encoded by the encoding block to be transmitted from the first communication block; and a display apparatus having a second communication block, a decoding block, and a monitor. In this configuration, the encoded moving image data transmitted from the first communication block is received by the second communication block to be decoded by the decoding block, the decoded moving image data being displayed on the monitor. The encoding block has an encoding execution block configured to encode moving image data in accordance with setting; and a setting block configured to execute setting to the encoding execution block. In this configuration, if an image of the moving image data is darker than usual, the setting block executes setting so as to decrease a code amount of the dark image of the moving image data, and the encoding execution block encodes the dark image of the moving image data in accordance with the setting for decreasing the code amount of the dark image.

As described above and according to embodiments of the disclosure, dark images can be preferably encoded.

BRIEF DESCRIPTION OF THE DRAWINGS

FIG. 7 is a diagram illustrating one example of a mode decision table for use by a mode management block shown in FIG. 1;

FIG. 8 is a diagram illustrating one example of an encoding parameter table for use by an encoding method management block shown in FIG. 1;

FIG. 9 is a sequence chart indicative of an overall operation of the imaging apparatus shown in FIG. 1;

FIG. 17 is a sequence chart indicative of an overall operation of the imaging apparatus shown in FIG. 16; and FIG. 18 is a schematic block diagram illustrating a monitoring system practiced as a fourth embodiment of the disclosure.

DETAILED DESCRIPTION OF THE PREFERRED EMBODIMENTS

This disclosure will be described in further detail by way of embodiments thereof with reference to the accompanying drawings. The description will be made in the following order:

1. First embodiment (an example of an imaging apparatus 1 configured to determine on the basis of the frame rate of an input image whether the image is a dark image or not)

2. Second embodiment (an example of an imaging apparatus 1 configured to determine on the basis of imaging information about moving image data whether an image is a dark image or not)

3. Third embodiment (an example of an imaging apparatus 1 configured to determine on the basis of increase or decrease of encoded frame data 21 whether an image is a dark image or not)

4. Fourth embodiment (an example of an imaging system)

1. First Embodiment

Configuration of the Imaging Apparatus 1

Figure 1:
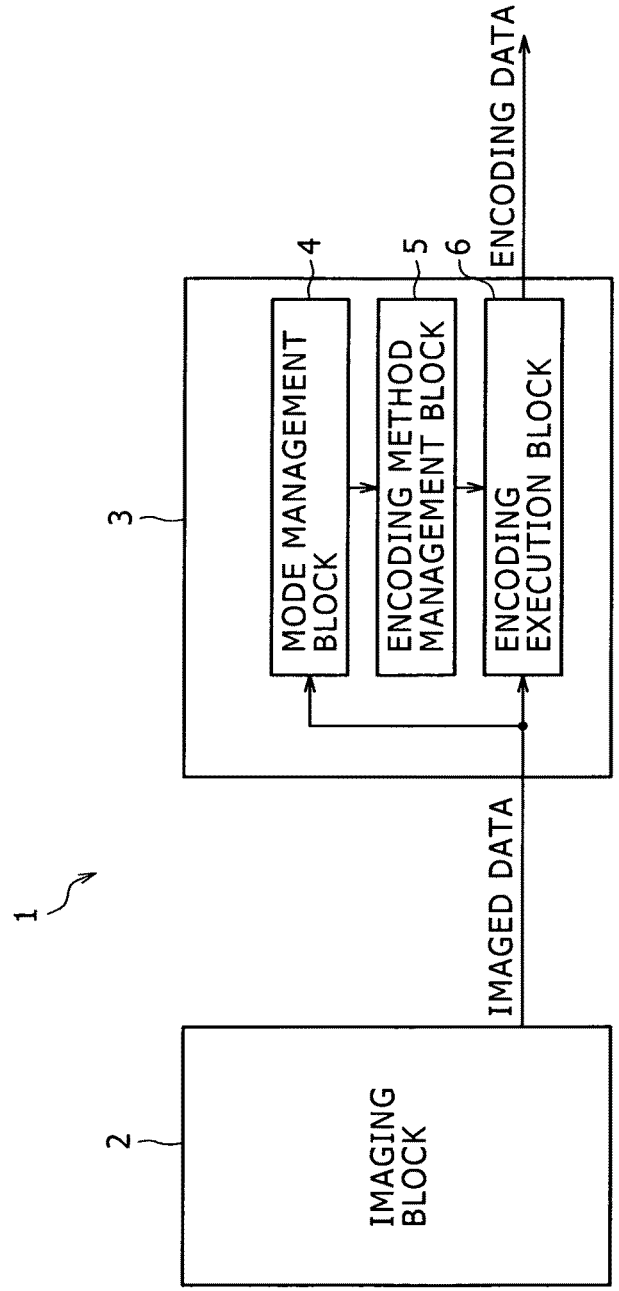
FIG. 1 is a schematic block diagram illustrating an imaging apparatus practiced as a first embodiment of the disclosure.

Now, referring to FIG. 1, there is shown a schematic block diagram illustrating an imaging apparatus 1 practiced as the first embodiment of the disclosure.

The imaging apparatus 1 shown in FIG. 1 has an imaging block 2 and an encoding block 3 connected thereto. The encoding block 3 has a mode management block 4, an encoding method management block 5, and an encoding execution block 6.

The imaging block 2 continuously takes images and outputs a signal of moving image data including two or more imaged frame data 21.

The mode management block 4 is connected to the imaging block 2.

The mode management block 4 determines on the basis of the frame rate of the frame data 21 in the imaged data entered from the imaging block 2 whether the taken moving image data is a dark moving image or not.

If the frame rate gets low, the mode management block 4 determines that the taken moving image data is a dark moving image.

The mode management block 4 outputs the determined mode as a mode signal.

The operation mode of the encoding block 3 determined by the mode management block 4 is a normal mode or a dark mode.

In the dark mode, the frame data 21 obtained by taking an image in the dark is encoded.

In the normal mode, the frame data 21 obtained by taking an image at a normal brightness level brighter than the dark level is encoded.

The encoding method management block 5 is connected to the encoding execution block 6, the imaging block 2, and the mode management block 4.

The encoding method management block 5 sets an encoding scheme to the encoding execution block 6 to make the encoding execution block 6 execute a standard-compliant encoding scheme, such as MPEG 1, 2, or 4 or H.264, for example.

For this purpose, the encoding method management block 5 sets basic parameters, such as a fixed frame rate, a GOP length, encoding schemes (I, P, and B) for pictures, a quantization table, and a quantization amount, to the encoding execution block 6.

The encoding method management block 5 has two or more sets of encoding parameters for the operations modes of the encoding block 3.

On the basis of the mode signal and so on entered from the mode management block 4, the encoding method management block 5 selects one set of encoding parameters.

The encoding method management block 5 outputs a setting signal for setting the selected encoding parameter set.

The encoding execution block 6 is connected to the imaging block 2 and the encoding method management block 5.

The encoding execution block 6 switches between encoding schemes on the basis of the entered setting signal.

The encoding execution block 6 encodes the moving image data entered from the imaging block 2 by the selected encoding scheme.

On the basis of the above-mentioned series of operations, the imaging apparatus 1 determines that a dark moving image is being taken when the frame rate of the frame data 21 in the image data entered from the imaging block 2 gets low, thereby switching the encoding parameters to those for a dark image to encode the frame data 21. The encoded moving image data is outputted from the encoding execution block 6.

Figure 2:
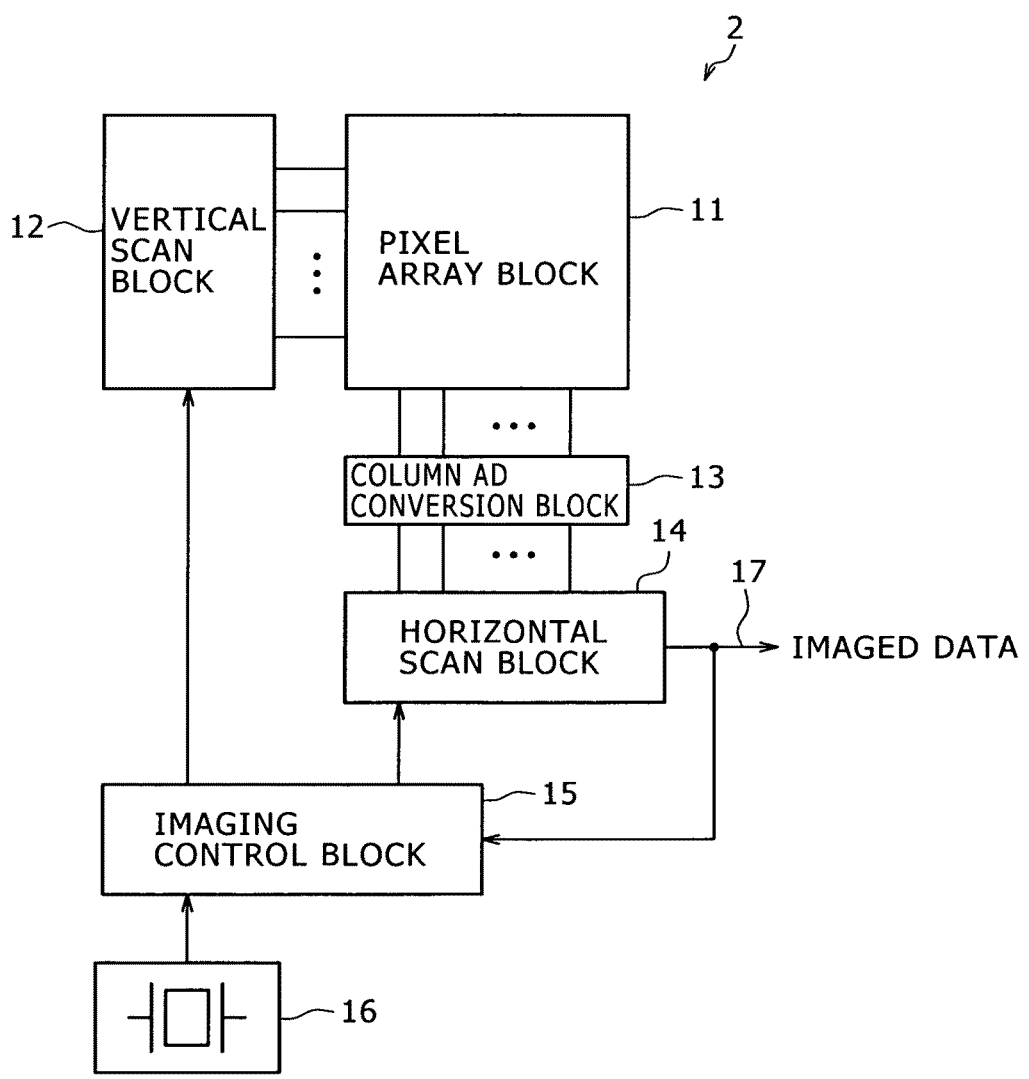
FIG. 2 is a schematic block diagram illustrating an imaging block shown in FIG. 1.

Referring to FIG. 2, there is shown a schematic block diagram illustrating the imaging block 2.

The imaging block 2 shown in FIG. 2 has a pixel array block 11, a vertical scan block 12, a column AD (Analog to Digital) conversion block 13, a horizontal scan block 14, an imaging control block 15, and a clock signal generation block 16.

These component blocks are formed on a semiconductor substrate in a layout shown in FIG. 2.

The pixel array block 11 has two or more pixel circuits.

Each pixel circuit has a photoelectric conversion element and a transfer transistor not shown, for example.

These two or more pixel circuits are two-dimensionally arranged on one plane of the semiconductor substrate.

The vertical scan block 12 is connected to the pixel array block 11 with two or more select signal lines.

The select signal lines are connected to two or more pixel circuits in each row of the two-dimensional array.

The vertical scan block 12 selects one of the two or more select signal lines, for example, and controls the electric potential of the select signal line.

Consequently, one row of pixel circuits among the two or more two-dimensionally arranged pixel circuits.

The column AD conversion block 13 has two or more AD conversion blocks.

These two or more AD conversion blocks are connected to the pixel array block 11 with two or more vertical signal lines.

The vertical signal lines are connected to two or more pixel circuits of each column in the two-dimensional array.

The AD conversion block amplifies a signal read from the photoelectric conversion element of each of the pixel circuits of the selected column to convert the amplified signal into a pixel value.

The horizontal scan block 14 is connected to two or more AD conversion blocks of the column AD conversion block 13 and a horizontal output signal line 17.

The horizontal scan block 14 sequentially selects the two or more AD conversion blocks of the column AD conversion block 13 and outputs signals of two or more pixel values obtained by these two or more AD conversion blocks to the horizontal output signal line 17.

The imaging control block 15 is connected to the vertical scan block 12, the horizontal scan block 14, and the clock signal generation block 16.

In synchronization with a clock signal, the imaging control block 15 controls the operations of the vertical scan block 12 and the horizontal scan block 14 in synchronization with a clock signal.

Consequently, the vertical scan block 12 sequentially selects two or more pixel circuits, column by column, for example.

The horizontal scan block 14 outputs the two or more pixel values of the pixel circuits for one column in each select interval of each column to the horizontal output signal line 17.

One read operation described above outputs one imaged frame data 21 from the imaging block 2.

Repeating the above-mentioned read operation allows the imaging block 2 to sequentially output two or more frame data 21.

These two or more frame data 21 make up the taken moving image data.

In the imaging control block 15, the frame data 21 is entered.

On the basis of the entered frame data 21, the imaging control block 15 determines an imaging environment.

The imaging control block 15 computes the average brightness of two or more frame data 21 and accumulates two or more pixel values.

Then, the imaging control block 15 determines the average brightness or the accumulated value to adjust the imaging time and imaging interval of each taken image so as to bring the brightness of the image within a predetermined brightness range.

For example, if the average brightness or the accumulated value is found to be below a predetermined value, then the imaging control block 15 extends the imaging interval (or the frame rate) of each image to secure the imaging time of each image, thereby controlling the imaging such that a proper exposure is obtained in the ensured imaging time.

Figure 3:
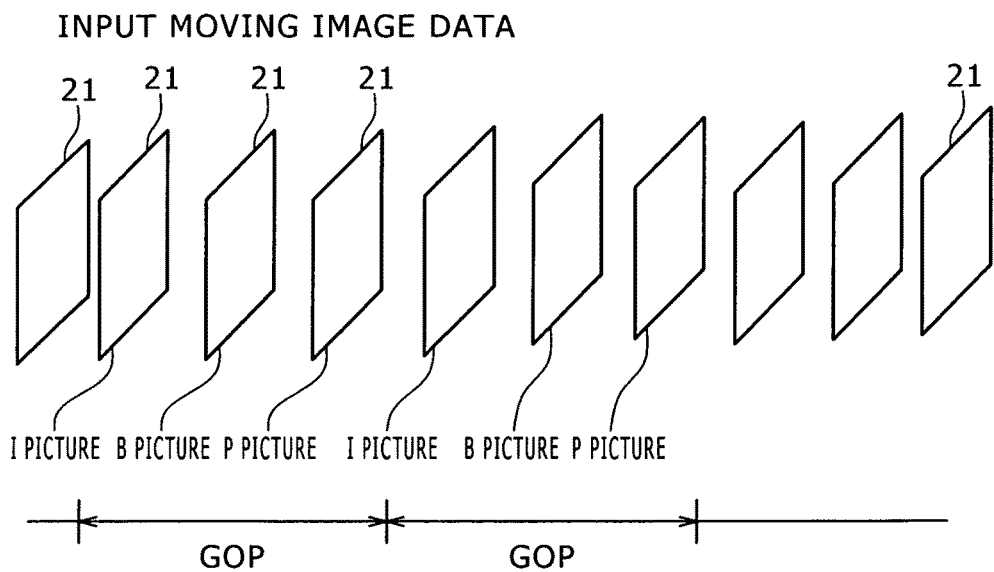
FIG. 3 is a schematic diagram illustrating one example of moving image data that is encoded by the imaging apparatus shown in FIG. 1.

Referring to FIG. 3, there is shown one example of moving image data that is encoded by the imaging apparatus 1 shown in FIG. 1.

The moving image data shown in FIG. 3 has the frame data 21 of two or more images.

The moving image data shown in FIG. 3 is outputted from the imaging block 2 to the encoding block 3.

The moving image data shown in FIG. 3 is encoded starting with the left-side frame sequentially for each group of the frame data 21 of three frames for example.

The unit in which this encoding is executed is called GOP (Group Of Pictures).

In the example shown in FIG. 3, the left-most frame in each GOP is encoded as an I (Intra) picture. The I picture is encoded without referencing other frames.

The second frame from the left-most frame is encoded as a B (Bidirectional predictive) picture. The B picture is encoded by referencing the I picture and a P picture in the same GOP.

The third frame from the left-most frame is encoded as a P (Predictive) picture. The P picture is encoded by referencing the I picture encoded before in the same GOP.

Figure 4:
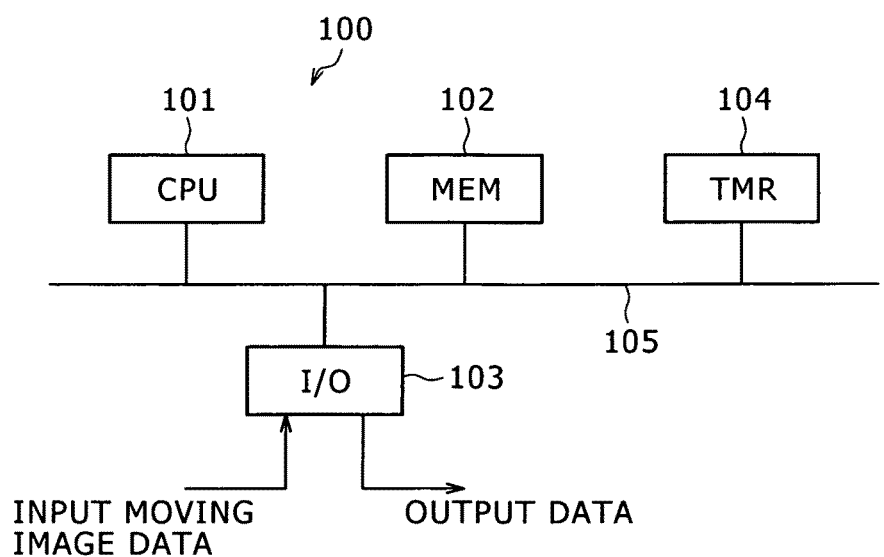
FIG. 4 is a block diagram illustrating a computer apparatus with which an encoding block shown in FIG. 1 is realized.

Referring to FIG. 4, there is shown a block diagram illustrating a computer apparatus by which the encoding block 3 is realized.

The computer apparatus 100 shown in FIG. 4 has a CPU (Central Processing Unit) 101, a memory (MEM) 102, an input/output block (I/O) 103, and a timer (TMR) 104. The CPU (Central Processing Unit) 101, the memory 102, the input/output block 103, and the timer 104 are connected to a system bus 105.

It should be noted that the computer apparatus 100 shown in FIG. 4 is realized by a semiconductor integrated circuit for example.

The memory 102 stores an encoding program.

The encoding program stored in the memory 102 may be stored in the memory 102 before or after the shipment of the computer apparatus 100 from the factory.

The encoding program stored in the memory 102 after the shipment of the computer apparatus 100 may be one read from a computer-readable recording media or downloaded through transmission media, such as the Internet, for example.

The CPU 101 reads the encoding program from the memory 102 and executes the read encoding program.

Consequently, the mode management block 4, the encoding method management block 5, and the encoding execution block 6 shown in FIG. 1 are realized in the CPU 101.

It should be noted that, in FIG. 4, moving image data to be entered in the encoding block 3 is entered from the input/output block 103 for example to be stored in the memory 102.

The moving image data encoded by the encoding execution block 6 is stored in the memory 102 and then outputted to the outside from the input/output block 103.

Figure 5:
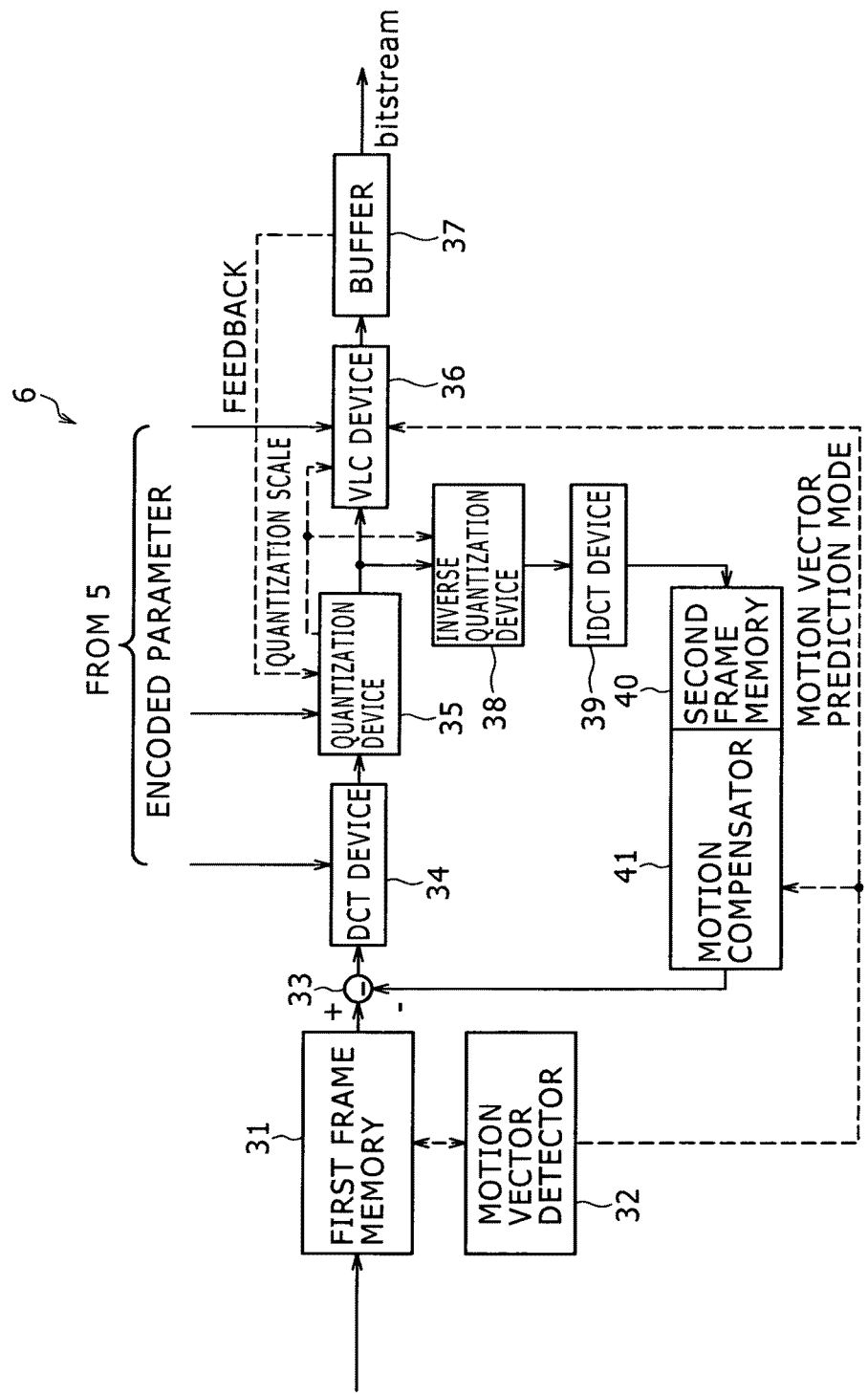
FIG. 5 is a block diagram illustrating an encoding execution block shown in FIG. 5.

Referring to FIG. 5, there is shown a block diagram illustrating the encoding execution block 6 shown in FIG. 1.

The encoding execution block 6 shown in FIG. 5 encodes moving image data by the MPEG4 visual scheme. The encoding execution block 6 shown in FIG. 5 encodes two or more frame data 21 for each set GOP.

The encoding execution block 6 shown in FIG. 5 has a first frame memory 31, a motion vector detector 32, a subtracter 33, a DCT (Discrete Cosine Transform) device 34, and a quantization device 35.

In addition, the encoding execution block 6 shown in FIG. 5 has a VLC (Variable Length Code) device 36, and a buffer 37.

Further, the encoding execution block 6 shown in FIG. 5 has an inverse quantization device 38, an IDCT (Inverse DCT) device 39, a second frame memory 40, and a motion compensator 41.

The first frame memory 31 stores an imaged based on the frame data 21 outputted from the input/output block 103.

The motion vector detector 32 is connected to the first frame memory 31.

For a new image to be encoded that is stored in the first frame memory 31, the motion vector detector 32 detects a motion vector of an object common to an image of another frame data 21.

At this moment, the motion vector detector 32 detects a motion vector on the basis of the frame data 21 in the direction of preset motion vector search and reference range.

Normally, the motion vector detector 32 detects a motion vector on the basis of the preceding frame data 21 already encoded in the same GOP.

The subtracter 33 is connected to the first frame memory 31 and the motion compensator 41.

The subtracter 33 subtracts the image stored in the second frame memory 40 that was compensated by the motion compensator 41 from the image stored in the first frame memory 31.

The DCT device 34 is connected to the subtracter 33.

The DCT device 34 executes, for each predetermined block, discrete cosine transform on the image differentially computed by the subtracter 33.

The quantization device 35 is connected to the DCT device 34.

The quantization device 35 quantizes a DCT coefficient for each frequency band obtained by the discrete cosine transform for each block of the DCT device 34.

At this moment, the quantization device 35 executes the DCT coefficient quantization by use of preset quantization amount Qp and a quantization table.

The VLC device 36 is connected to the quantization device 35.

The VLC device 36 variable-length-encodes the DCT coefficient data quantized by the quantization device 35.

The VLC device 36 outputs the encoded data to the buffer 37.

Consequently, the encoded frame data 21 is stored in the buffer 37.

From the buffer 37, the encoded frame data 21 is outputted to the input/output block 103 shown in FIG. 4.

The VLC device 36 is also connected to the motion vector detector 32 and outputs the data of the motion vector detected by the motion vector detector 32 to the buffer 37.

Encoding parameters are set to the DCT device 34, the quantization device 35, and the VLC device 36 by the encoding method management block 5.

On the basis of these parameters, the DCT device 34, the quantization device 35, and the VLC device 36 adjust block size, the degree of quantization, and the method of quantization.

The quantization device 35 also reads the data amount of the encoded frame data 21 stored in the buffer 37.

The quantization device 35 determines on the basis of the unique decision according to this data amount whether the encoding of the frame data 21 is necessary or not.

The inverse quantization device 38 is connected to the quantization device 35.

The inverse quantization device 38 generates a DCT coefficient of the quantized frame data 21 from the DCT coefficient quantized by the quantization device 35.

The IDCT device 39 is connected to the inverse quantization device 38.

The IDCT device 39 generates an image of the quantized frame data 21 from the DCT coefficient generated by the inverse quantization device 38.

In the second frame memory 40, this image of the quantized frame data 21 is stored.

The motion compensator 41 is connected to the motion vector detector 32 and the second frame memory 40.

The motion compensator 41 generates an image obtained by moving an image stored in the second frame memory 40 on the basis of a motion vector detected by the motion vector detector 32.

Figures 6A, 6B, 6C:
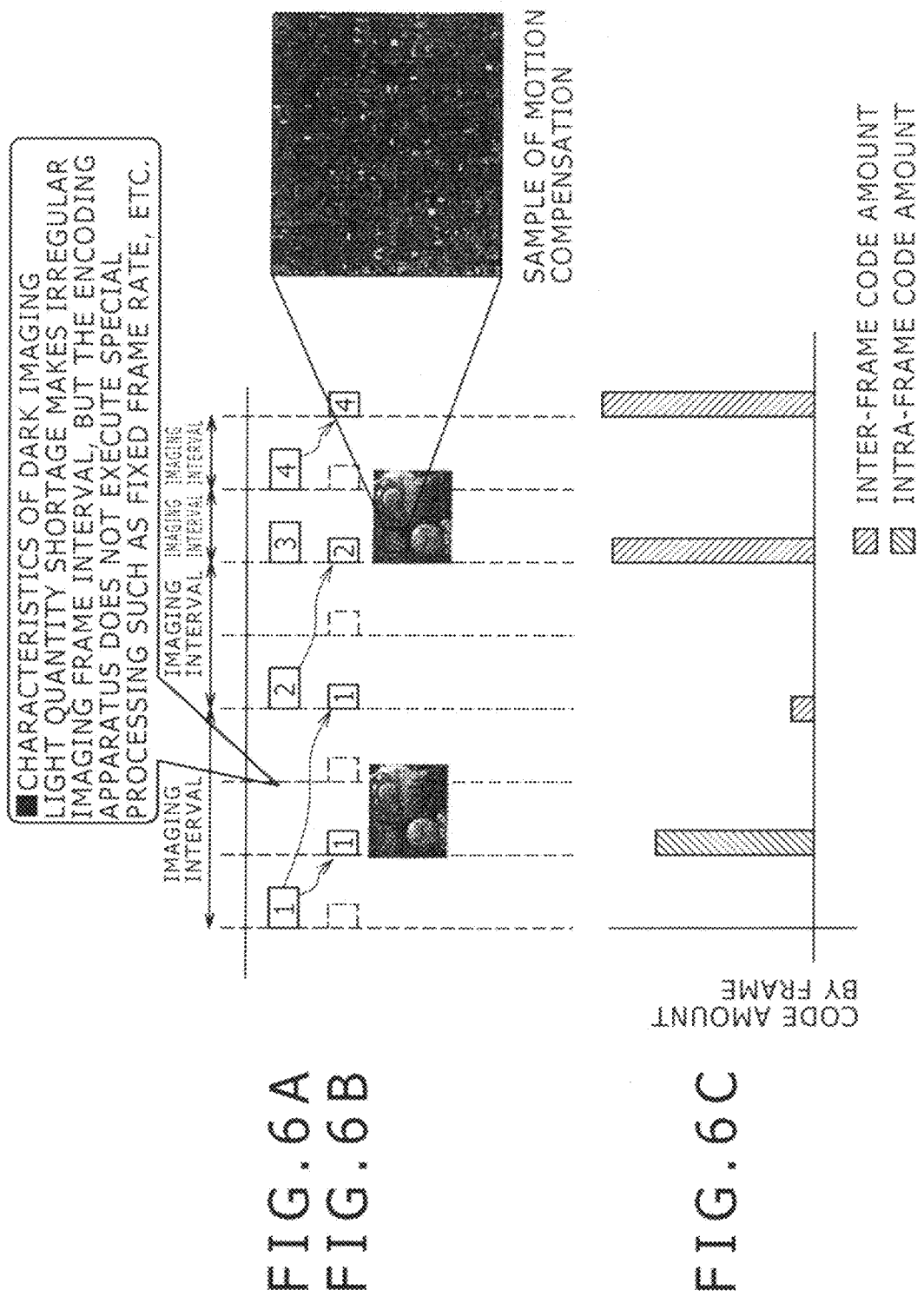
FIGS. 6A, 6B, and 6C are diagrams illustrating a sole operation of the encoding execution block shown in FIG. 5.

Referring to FIGS. 6A to 6C, there is shown diagrams showing a sole operation of the encoding execution block 6.

FIG. 6A shows moving image data obtained by taking darkness.

FIG. 6B shows data encoded by the encoding execution block 6.

FIG. 6C shows an encoded data amount of each encoded data shown in FIG. 6B.

In FIGS. 6A to 6C, time passes from the left side to the right side.

In order to execute the encoding processing shown in FIGS. 6A to 6C, the encoding method management block 5 sets such encoding parameters compliant with a predetermined standard as fixed frame rate, GOP length, type (I, P, or B) of picture to be encoded, quantization table, and quantization amount.

If darkness is being taken, the imaging block 2 ensures an exposure time of each image by controlling frame rate so as to supplement a poor light amount.

For this purpose, the intervals of two or more frame data 21 outputted from the imaging block 2 are not constant as shown in FIG. 6A. The frame intervals are irregular.

If there is any variation between the imaging frame intervals and the encoding execution block 6 executes encoding processing with a constant fixed frame rate on the basis of the settings of the encoding execution block 6, then the two or more taken frame data 21 may not be encoded as shown in FIG. 6B.

In FIG. 6A, the third frame data 21 is not encoded.

It is also possible that the same frame data 21 is encoded two or more times.

In FIG. 6A, the first frame data 21 is encoded twice.

The second encoded frame data 21 is the first frame data 21 that has no motion and therefore does not increase the information amount, which is wasted.

Further, assume that the encoding execution block 6 execute intra-frame encoding in the first encoding processing shown in FIG. 6B and inter-frame encoding in the subsequent encoding processing.

Then, the encoded data amount of the first intra-frame becomes the normal frame data amount as shown in FIG. 6C.

The encoded data amount of the second inter-frame becomes a frame dada amount that is smaller than the normal frame data amount because the same image as the first frame is encoded.

The encoded data amount of the third inter-frame becomes a frame data amount that is greater than the frame data amount of the first intra-frame.

The encoded data amount of the fourth inter-frame becomes a frame data amount that is greater than the frame data amount of the first intra-frame.

If darkness is taken as described above, the second inter-frame based on a fixed frame rate provides the same image as the first inter-frame, so that the second inter-frame is wasted.

The data amounts of the third and fourth inter-frames are each greater than the data amount of the intra-frame that does not reference other images although the third and fourth inter-frames are encoded with other images referenced.

The reason of the above-mentioned phenomena may be that a large amount of noise components is included in each image taken in the darkness due to the ensuring of an enough exposure time and these noise components are different from image to image.

This means that, as the number of inter-frames increases, the amount of encoding increases.

As for the image that is encoded as the first intra-frame shown in FIG. 6B, a large amount of quantization noise at the time of imaging is included in the image. Hence, generally, the encoded data amount of this image is greater than an image taken under a normal brightness condition.

Therefore, if the frame data 21 taken in the dark is encoded by an encoding scheme compliant with one of the standards such as MPEG 1, 2, or 4 or H.264, the encoded data greater in data amount than normal is generated.

In order to bring this encoded data greater than normal into a standard-compliant data amount range, the encoding execution block 6 adjusts the encoded data amount to decrease the encoded data more than normal.

As a result, the picture quality of an image that is unclear in the dark is deteriorated more than that of a normal image.

In order to solve the above-mentioned problems involved in the encoding, the encoding block 3 of the first embodiment has the encoding method management block 5 and the mode management block 4 in addition to the encoding execution block 6.

Referring to FIG. 7, there is shown one example of a mode decision table for use by the mode management block 4.

The mode decision table shown in FIG. 7 is stored in the memory 102 shown in FIG. 4 for example.

The mode management block 4 determines the operation mode of the encoding block 3 on the basis of the frame rate of the frame data 21 entered from the imaging block 2.

If the frame rate is found to be greater than a predetermined threshold value, then the mode management block 4 determines the operation mode to be the dark mode.

If the frame rate is found to be lower than the predetermined threshold value, then the mode management block 4 determines the operation mode to be the normal mode.

It should be noted that, for this frame rate threshold value, the frame rate value in the normal mode of the imaging block 2 may be used, for example. Description of encoding parameters for dark image Referring to FIG. 8, there is shown one example of an encoding parameter table for use by the encoding method management block 5 shown in FIG. 1.

The encoding parameter table shown in FIG. 8 is stored in the memory 102 shown in FIG. 4 for example.

On the basis of a mode signal entered from the mode management block 4, the encoding method management block 5 selects the value of the dark mode or the value of the normal mode.

Then, the encoding method management block 5 outputs a setting signal that is used to set the selected mode value to the encoding execution block 6.

The encoding parameter table shown in FIG. 8 has both the normal mode value and the dark mode value for two or more encoding parameter tables used for encoding the frame data 21 by the encoding execution block 6.

To be more specific, the normal mode value for the quantization table is "TBL1" and the dark mode value is "TBL2."

The quantization table has the values of cutting ratios of frequency component for each frequency component of an image.

It should be noted that the second quantization table may be one in which the cutting ratio of the high-frequency part is greater than that of the first quantization table.

Consequently, the quantization noise generated at the timing of imaging included in the frame data 21 of an encoded dark image can be reduced.

At the same time, the increase in the amount of codes due to the quantization noise at the time of imaging included in the image can be suppressed.

Quantization amount Qp is one type of quantization parameters.

The value of the normal mode for quantization amount Qp is "q1" and the value of the dark mode is "q2."

The encoding execution block 6 executes quantization processing in accordance with preset quantization amount Qp.

It should be noted that quantization amount q2 of the dark mode may be one in which the value of high-frequency part is sufficiently larger than quantization amount q1 of the normal mode.

Consequently, the quantization noise at the time of imaging included in the frame data 21 of an encoded dark image can be reduced.

At the same time, the increase in the amount of codes due to the quantization noise at the time of imaging included in the image can be suppressed.

The value of the normal mode for the motion vector search of an inter-frame is "present" and the value of the dark mode is "absent (or fixed)."

When the motion vector search becomes absent (fixed), the motion vector of the inter-frame is fixed.

Consequently, the encoding processing is simplified and the power consumption of the encoding block 3 is lowered.

It should be noted that combining this fixing processing with intra-fixing to be described later can suppress the increase in the amount of codes or picture quality deterioration due to fixation.

The value of the normal mode for the presence or absence of encoding repetition is "absent" and the value of the dark mode is "present."

If the encoding processing is repeated, the encoding processing takes time. Hence, repeated encoding is not executed because the encoding has to be executed at a constant frame rate in the normal mode.

By contrast, in the dark mode, the imaging block 2 outputs the frame data 21 at a frame rate lower than normal.

In the dark mode, the encoding processing is repeated so as to effectively use this long frame interval.

Consequently, by effectively using the long frame interval, the encoding execution block 6 is able to be execute the encoding processing so as to get optimum code amount and picture quality.

The value of the normal mode for the presence/absence of switching between intra and inter is "absent" and value of the dark mode is "present."

The value of the normal mode for the presence/absence of intra-fixing is "absent" and the value of the dark mode is "present."

An image taken in the dark includes many quantization noises at the time of imaging.

Also, the quantization noises at the time of imaging are different between the images consecutively taken.

Hence, in the dark mode, intra/inter switching is present. At the same time, intra-fixing is present.

Consequently, when the frame interval (the inverse number of the frame rate) is widened by the imaging in the dark, the encoding execution block 6 forcibly switches the frame data 21 with inter-frame encoding specified to the intra-frame encoding regardless of the basic setting.

As a result, if the quantization noise at the time of imaging is largely different between the images consecutively taken in the dark, the encoding execution block 6 is able to suppress the increase in the code amount due to the quantization noises at these different imaging times.

The value of the normal mode for an encoded frame rate is "fixed (=the normal frame rate of the imaging block 2) and the value of the dark mode is "non-fixed (variable)."

In imaging the darkness, the imaging block 2 varies the imaging frame rate.

Hence, if the encoding processing is executed with the input at a fixed frame rate presupposed, the frame data 21 of the same image may be encoded two or more times or the frame data 21 of an image not encoded may occur.

In the dark mode, the encoded frame rate is non-fixed.

In this case, every time the new frame data 21 is entered, the encoding execution block 6 executes the encoding processing of this frame data 21.

Consequently, the interval in the taken moving image data corresponding to one GOP length is extended.

In addition, this can decrease the unnecessary encoding associated with the same image and increase the encoding allocation to other frames, thereby enhancing a total picture quality.

Further, a combination of the non-fixed frame rate and fixed GOP length allows the extension of the interval to which GOP corresponds.

The value of the normal mode concerning the presence or absence of user data is "any (namely, present or absent)" and the value of the dark mode is "present."

The encoding execution block 6 adds the user data including the information indicative that the image is a dark image to the moving image data made up of the encoded frame data 21.

Consequently, interpreting the user data at the time of decoding allows the changing of filter coefficients for the picture quality improvement after decoder so as to suppress the quantization noise at the time of taking the dark image.

The value of the normal mode for the intra-frame specification at the time if setting switching is "absent" and the value of the dark mode is "present."

In this case, the encoding execution block 6 encodes, as an intra-frame, the first frame data 21 immediately after the updating of the setting of the encoding parameter regardless of the basic settings of GOP and so on.

Consequently, the encoding can be realized with a minimum code amount.

At the same time, including this information in the user data allows a decoding block 73 shown in FIG. 18 to be described later to obtain a change point and a scene change.

Operation of the Imaging Apparatus 1

The following describes an operation of the imaging apparatus 1.

Referring to FIG. 9, there is shown a sequence chart indicative of an overall operation of the imaging apparatus 1 shown in FIG. 1.

In FIG. 9, time passes from up to down.

In the imaging apparatus 1, the imaging block 2 starts imaging processing and outputs obtained moving image data to the encoding block 3 (step ST1).

To be more specific, the imaging block 2 repetitively outputs the frame data 21 of an image taken with an exposure time according to the imaging environment, with an imaging frame rate corresponding to this exposure time.

Normally, the encoding execution block 6 executes the encoding processing for each normal imaging frame rate of the imaging block 2.

When new frame data 21 is entered from the imaging block 2, the mode management block 4 executes mode decision processing (steps ST2-1 and ST2-2).

Figure 10:
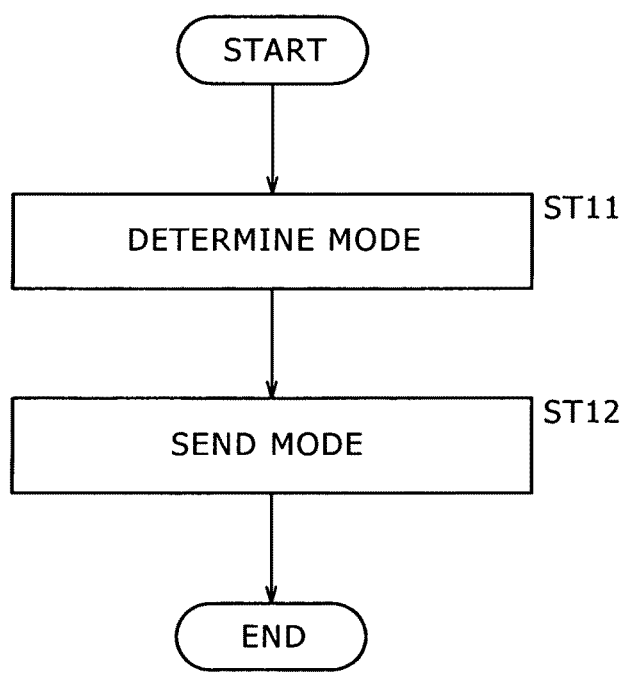
FIG. 10 is a flowchart indicative of an operation of the mode management block shown in FIG. 1.

Referring to FIG. 10, there is shown a flowchart indicative of an operation of the mode management block 4.

In the mode decision processing, the mode management block 4 executes the mode decision processing (step ST11).

In the mode decision processing, the mode management block 4 determines on the basis of the imaging frame rate of the frame data 21 in the imaging data entered from the imaging block 2 whether the taken moving image data is a dark moving image or not.

As shown in FIG. 7, when the imaging frame rate for the most recently entered frame data 21 for example gets lower than the imaging frame rate at the time of normal imaging, the mode management block 4 determines that the taken moving image data is a dark moving image.

The mode management block 4 computes an elapsed time between the input time of the last frame data 21 measured by the timer 104 for example and the input time of the frame data 21 entered this time.

Next, the mode management block 4 determines whether the computed elapsed time at the current point of time is longer than the elapsed time of the imaging frame rate at the time of normal imaging so far.

Then, if the computed elapsed time at the current point of time is longer than the elapsed time of the imaging frame rate at the time of normal imaging so far, the mode management block 4 determines that the imaging frame rate gets low.

It should be noted that the mode management block 4 may make this determination by comparing the normal imaging frame rate stored in the memory 102 with the current frame interval measured by the timer 104.

On the other hand, if the imaging frame rate for the most recently entered frame data 21 matches the normal imaging frame rate, then the mode management block 4 determines that the taken moving image data is a normal moving image.

After executing the mode decision processing, the mode management block 4 sends the determined mode information (step ST12).

The mode management block 4 outputs a mode signal having the value of the determined mode.

This mode information is sent from the mode management block 4 to the encoding method management block 5 as shown in FIG. 9.

When the mode information is entered, the encoding method management block 5 selects an encoding method to be executed by the encoding execution block 6 (steps ST3-1 and ST3-2).

Figure 11:
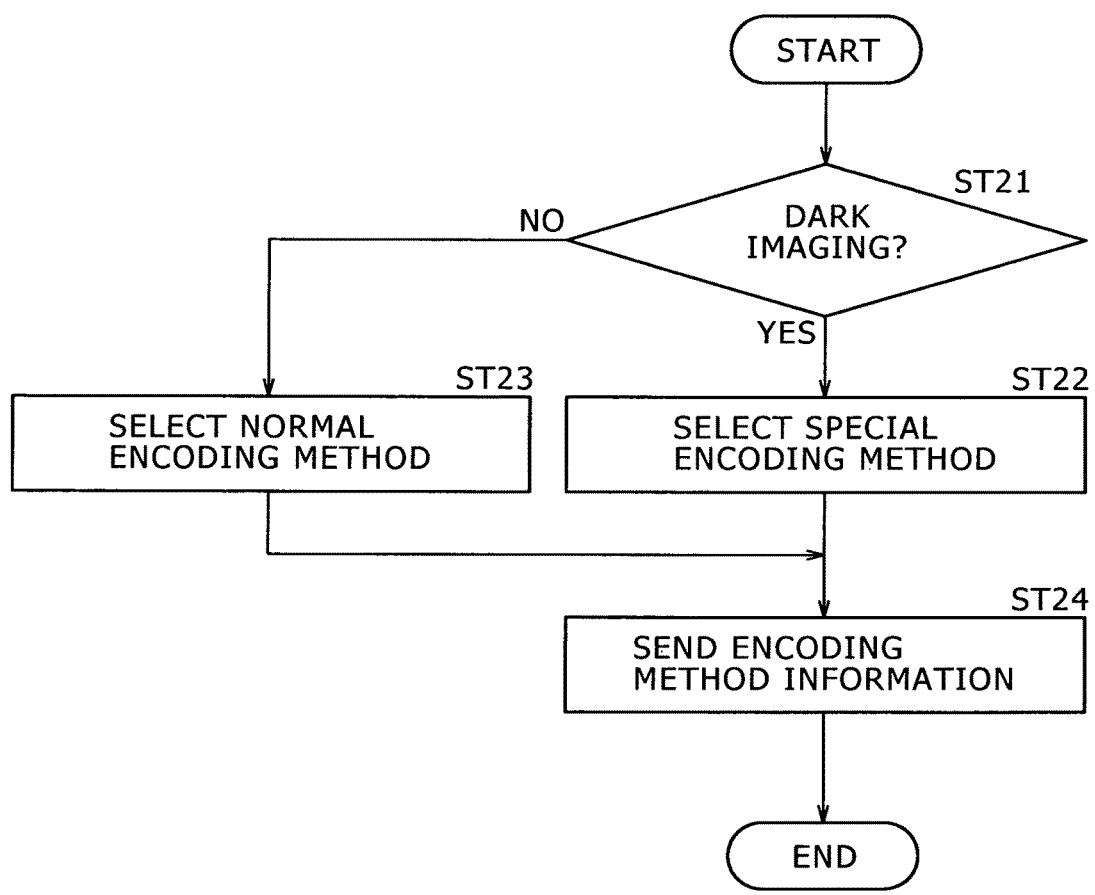
FIG. 11 is a flowchart indicative of an operation of the encoding method management block shown in FIG. 1.

Referring to FIG. 11, there is shown a flowchart indicative of an operation of the encoding method management block 5 shown in FIG. 1.

In the encoding method selection processing, the encoding method management block 5 determines whether the frame data 21 to be encoded entered from the imaging block 2 is a dark image or not (step ST21).

On the basis of the value of the mode signal, encoding method management block 5 executes the above-mentioned determination.

If the frame data 21 is found to be a dark image, then the encoding method management block 5 selects the encoding method for a dark image (step ST22).

The encoding method management block 5 selects the encoding parameter of the dark mode at the left side in FIG. 8.

If the frame data 21 is found to be not a dark image, then the encoding method management block 5 selects the normal encoding method (step ST23).

The encoding method management block 5 selects the encoding parameter of the normal mode at the right side in FIG. 8.

After selecting the encoding method, the encoding method management block 5 sends the information about the selected encoding method (step ST24).

The encoding method management block 5 outputs a setting signal of the selected encoding parameter.

The encoding parameter setting signal is entered in the encoding execution block 6 as shown in FIG. 9.

When the encoding parameter setting signal is entered, the encoding execution block 6 executes the encoding processing on the frame data of the most recently entered image (steps ST4-1 and ST4-2).

Figure 12:
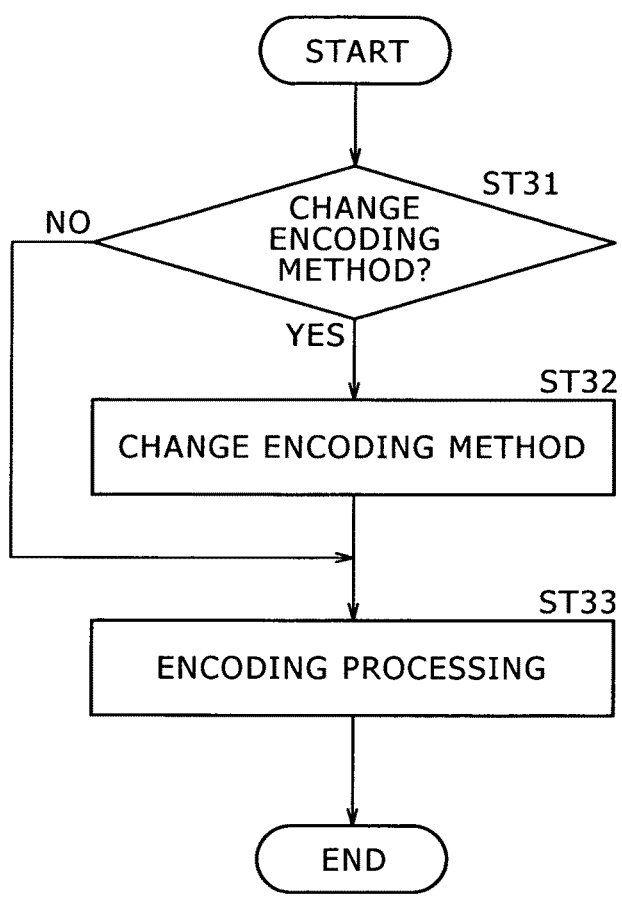
FIG. 12 is a flowchart indicative of an operation of the encoding execution block shown in FIG. 1.

Referring to FIG. 12, there is shown a flowchart indicative of an operation of the encoding execution block 6 shown in FIG. 1.

The encoding execution block 6 executes the encoding processing shown in FIG. 12 for every period equivalent to the normal imaging frame rate (or the fixed frame rate).

In the encoding processing for every normal imaging frame rate, the encoding execution block 6 first determines whether the encoding method is to be changed or not (step ST31).

If the contents of the encoding parameter setting signal are changed for example, then the encoding execution block 6 determines that the change of the encoding method is necessary; otherwise, the encoding execution block 6 determines that the changing of the encoding method is unnecessary.

If the changing of the encoding method is found necessary, then the encoding execution block 6 sets encoding parameters included in the entered setting signal onto the component blocks shown in FIG. 5 (step ST32).

Consequently, the encoding execution block 6 gets in a state ready for encoding the frame data 21 in the encoding mode selected by the encoding method management block 5 on the basis of the mode signal.

It should be noted that, if the changing of the encoding method is found to be unnecessary, then the encoding execution block 6 does not set the encoding parameters. The encoding execution block 6 continues to use the encoding method used so far.

After the updating the encoding parameters or if the changing of the encoding method is found to be unnecessary, then the encoding execution block 6 executes the encoding processing on the frame data 21 of the most recent image (step ST33).

The encoding execution block 6 encodes the frame data 21 of the most recent image under the newly set encoding parameters for example, thereby adjusting the code amount such that the code amount falls in the predetermined data amount range.

By the above-mentioned processing, each frame data 21 outputted from the imaging block 2 is encoded.

The encoding execution block 6 outputs each encoded frame data 21.

Consequently, the moving image data taken by the imaging block 2 is encoded.

Operation of the Encoding Block 3 for Normal Bright Images

Then, in the operations of taking and encoding moving images as described above, if a normal bright image for example has been taken, the encoding execution block 6 executes the encoding processing with the standard-compliant basic encoding parameters set by the encoding method management block 5.

The encoding execution block 6 executes the encoding processing for each timing of a fixed frame rate, for example.

The encoding execution block 6 quantizes the frame data 21 of each image in accordance with the GOP and the specification of a picture type to be encoded and encodes the quantized frame data 21.

Encoding each bright picture taken under the setting of the standard-compliant basic encoding parameters allows the reduction in the data amount of each image of a moving image.

It should be noted that each bright image taken under the above-mentioned condition includes a noise component due to the encoding like dark images. However, unlike the taking of dark images, each bright image has a large information amount from the beginning, so that the noise component due to the encoding is less conspicuous in the decoded image than that in dark images.

Operation of the Encoding Block 3 in the Case of Dark Images

If the frame data 21 of a dark image is found entered by the mode management block 4, the encoding method management block 5 sets the encoding parameter for the dark mode shown in FIG. 8 to the encoding execution block 6.

Next, if "non-fixed (variable)" is set for the encoding frame rate by the encoding method management block 5, then the encoding execution block 6 actually executes the encoding processing every time the frame data 21 of a new image is entered from the imaging block 2.

In addition, if "TBL2" is set for the value of the encoding mode, the encoding execution block 6 executes the quantization processing by use of the second quantization table for the dark mode stored in the memory 102.

If quantization amount "q2" is set, the encoding execution block 6 executes the quantization processing in accordance with set quantization amount Qp.

If "absent (fixed)" is set for the inter-frame motion vector search, then the encoding execution block 6 executes the encoding processing by use of a fixed motion vector.

If "present" is set for the repetition of encoding, then the encoding execution block 6 executes the encoding processing two or more times on the frame data 21 of the same image.

If "present" is set for the intra/inter switching, then the encoding execution block 6 encodes the frame data 21 of each image as an intra-frame even if the encoding of inter-frame is specified in the standard-compliant basic setting.

If "present" is set for the user data, then the encoding execution block 6 adds the user data including information indicative of a dark image to the moving image data made up of the encoded frame data 21.

If "present" is set for the intra-frame specification at the time of setting switching, then the encoding execution block 6 encodes the first frame data 21 after updating of the encoding parameter setting as an intra-frame regardless of the standard-compliant basic setting.

One Example of Moving Data Encoding

Figure 13:
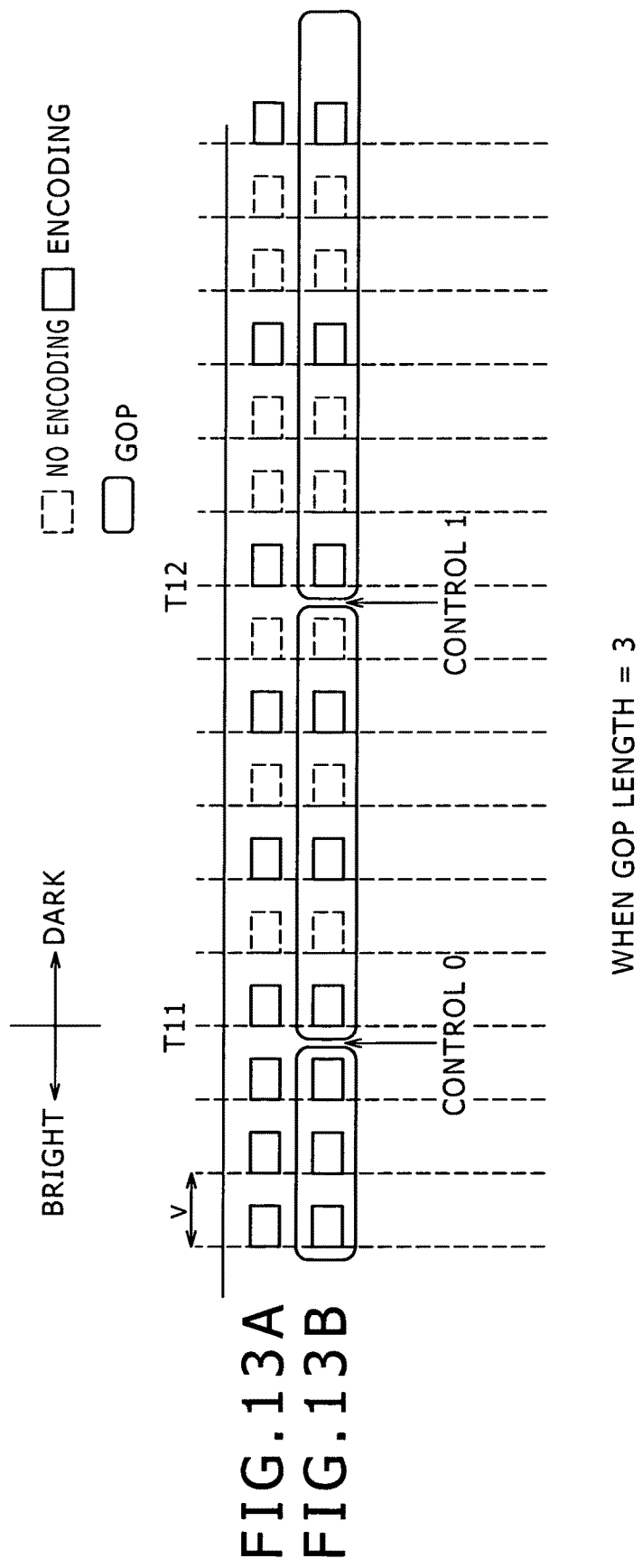
FIGS. 13A and 13B are diagrams illustrating one example of moving image data that is encoded by the imaging apparatus shown in FIG. 1.

Referring to FIG. 13, there is shown one example of moving image data that is encoded by the imaging apparatus 1 shown in FIG. 1.

FIG. 13A shows two or more frame data 21 to be outputted from the imaging block 2 to the encoding block 3.

FIG. 13B shows two or more frame data 21 encoded by the encoding block 3.

In FIGS. 13A and 13B, time passes from the left to the right.

As shown in FIG. 13A, the imaging block 2 outputs two or more frame data 21 at normal constant imaging frame rate V up to timing T11.

Then, subsequent to timing T11, the imaging environment is darkened, so that the imaging block 2 outputs two or more frame data 21 at imaging frame rate V double that before timing T11.

Subsequent to timing T12, the imaging environment is darker than at timing T11, the imaging block 2 outputs two or more frame data 21 at imaging frame rate V tripled that before timing T11.

Consequently, the imaging block 2 is able to ensure the exposure time of each image, thereby taking bright images even in a dark environment.

In this case, the contents of the encoding parameter setting signal outputted from the encoding method management block 5 to the encoding execution block 6 are changed at timing T11 and timing T12.

For example, before timing T11, the encoding processing is executed at a fixed frame rate; after timing T11, the encoding processing is executed at a variable frame rate.

Hence, as shown in FIG. 13B, the encoding execution block 6 switches between the execution timings for actually encoding the frame data 21 in accordance with the imaging frame rate.

To be more specific, the timing switching is executed such that, in the encoding processing before timing T11, the frame data 21 is encoded for every 1V interval in GOP length=3; after timing T11, the frame data 21 is encoded for every 2V interval.

After timing T12, the timing switching is executed such that the frame data 21 is encoded for every 3V interval.

Thus, the actual encoding processing is executed by the encoding execution block 6 only when the new frame data 21 is entered, thereby extending the interval corresponding to GOP.

It should be noted that the encoding execution block 6 encodes the first frame data 21 in each GOP as I frame, the second frame data 21 as B frame, and the third frame data 21 as P frame.

The first frame after the setting of encoding parameters is changed is encoded as I frame.

As described above, if a frame rate change occurs during dark imaging, the encoding block 3 of the first embodiment is able to properly encode two or more frame data 21 taken by following this change.

In addition, in the first embodiment, if the frame data 21 of an dark image includes many quantization noises at the time of imaging, the increase in the code amount can be suppressed by changing the encoding parameters such as quantization parameters to proper ones. If the frame data 21 of a dark image is encoded as an intra-frame or an inter-frame, the increase in code amount can be suppressed.

As a result, in the first embodiment, the picture quality of each image not clear due to darkness can be maintained to be higher than the case where the unclear image is encoded by use of normal encoding parameters.

Further, in the first embodiment, the encoding schemes are changed between normal image and dark image, so that these normal and dark images having different characteristics and information amounts can be preferably encoded by use of encoding schemes optimum to these images.

2. Second Embodiment

Configuration of an Imaging Apparatus 1

Figure 14:
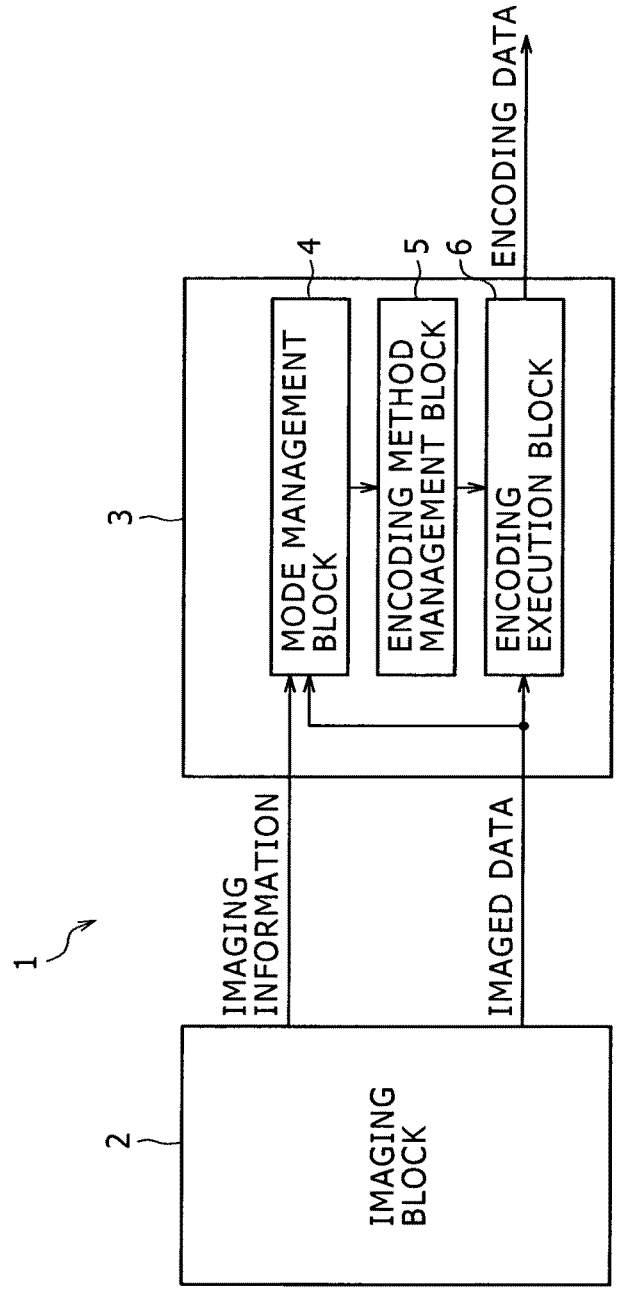
FIG. 14 is a schematic block diagram illustrating an imaging apparatus practiced as a second embodiment of the disclosure.

Referring to FIG. 14, there is shown a schematic block diagram illustrating an imaging apparatus 1 practiced as the second embodiment of the disclosure.

The imaging apparatus 1 shown in FIG. 14 has an imaging block 2 and an encoding block 3 connected to the imaging block 2.

The encoding block 3 has a mode management block 4, an encoding method management block 5, and an encoding execution block 6.

In the second embodiment, the mode management block 4 determines on the basis of imaging information about moving image data whether each image is a dark image or not.

It should be noted that components of the second embodiment similar to the components of the first image are denoted by the same reference numerals for easy understanding of the disclosure.

The imaging block 2 continuously takes images and outputs a signal moving image data including two or more taken frame data 21.

In addition, the imaging block 2 outputs a signal of imaging information about the frame data 21 of each image.

The imaging information is generated by an imaging control block 15.

The imaging control block 15 computes the average brightness of two or more frame data 21 and accumulates two or more pixel values.

Further, the imaging control block 15 compares the average brightness or the accumulated value and a predetermined darkness decision threshold value, for example.

Then, if the computed value is found to be lower than the decision threshold value, the imaging control block 15 generates the imaging information indicative that the image of the corresponding frame data 21 is an image of darkness or not.

If the computed value is found to be equal to or greater than the decision threshold value, then the imaging control block 15 generates the imaging information indicative that the image of the corresponding frame data 21 is one that has normal brightness.

It should be noted that the imaging information may be information that is indicative of at least one of the brightness of an image of each frame data 21, the exposure time in which the image of each frame data 21 was taken, and a time interval of imaging from the image of each frame data 21 immediately before of the images of frame data 21.

Each dark image has lower brightness, so that the exposure time of each image in the imaging block 2 gets longer, resulting in a longer frame interval.

The mode management block 4 is connected to the imaging block 2.

On the basis of a signal of imaging information entered from the imaging block 2, the mode management block 4 determines the imaging environment of each entered frame data 21 and outputs a mode signal.

For example, if the value if the imaging information is indicative of darkness, the mode management block 4 determines that the imaging environment of the frame data 21 is dark.

The encoding method management block 5 is connected to the mode management block 4.

The encoding method management block 5 has two or more sets of encoding parameters for the operation modes of the encoding block 3.

On the basis of the entered mode signal and so on, the encoding method management block 5 selects one set of the encoding parameters.

The encoding method management block 5 outputs a setting signal of the selected encoding parameters.

The encoding execution block 6 is connected to the imaging block 2 and the encoding method management block 5.

On the basis of the entered setting signal, the encoding execution block 6 switches between encoding schemes.

The encoding execution block 6 encodes the moving image entered from the imaging block 2 by use of the selected encoding scheme.

The above-mentioned sequence of operations allows the imaging apparatus 1 shown in FIG. 14 to determine whether the image concerned is a dark image or not on the basis of imaging information separate from the imaging data and, if the image is found to be a dark image, switches the encoding parameters and so on to those for dark images, thereby encoding the frame data 21.

The encoded moving data is outputted from the encoding execution block 6.

Operation of the Imaging Apparatus 1

Figure 15:
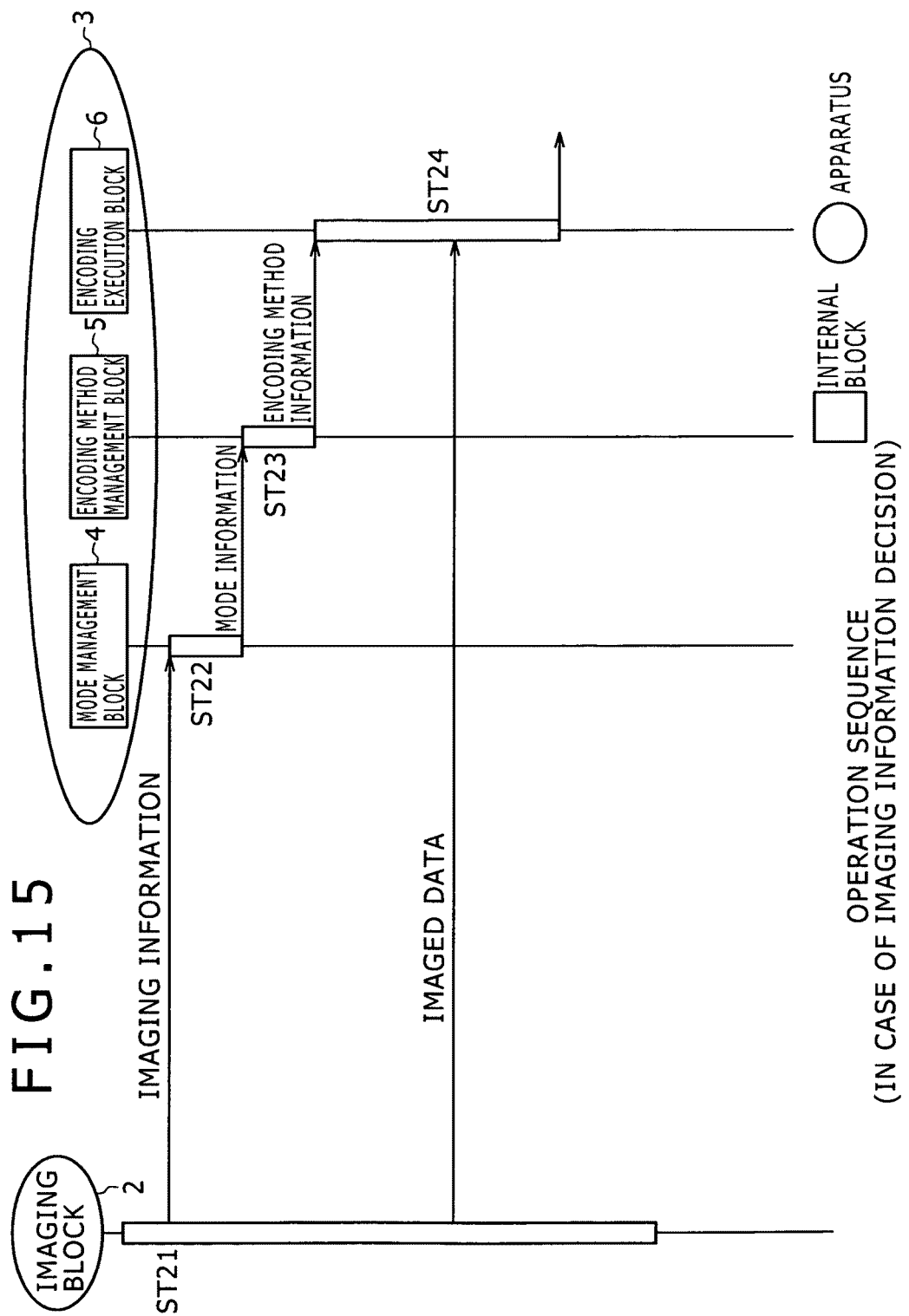
FIG. 15 is a sequence chart indicative of an overall operation of the imaging apparatus shown in FIG. 14.

Referring to FIG. 15, there is shown a sequence chart indicative of an overall operation of the imaging apparatus 1 shown in FIG. 14.

In the imaging apparatus 1, the imaging block 2 starts imaging processing (step ST21).

The imaging block 2 repetitively outputs the frame data 21 of the taken image to the encoding block 3.

At the same time, the imaging block 2 generates imaging information about each generated frame data 21 and repetitively outputs the imaging information to the encoding block 3.

When the imaging information about new frame data 21 is entered from the imaging block 2, the mode management block 4 of the encoding block 3 determines an encoding mode (step ST22).

The mode management block 4 outputs a mode signal having the value of the determined mode to the encoding method management block 5.

When the mode signal is entered, the encoding method management block 5 selects a encoding method corresponding to the encoding mode determined by the mode management block 4 (step ST23).

The encoding method management block 5 outputs the setting signal of the parameters of the selected encoding method to the encoding execution block 6.

When the setting signal of the parameters of the encoding method is entered, the encoding execution block 6 sets the encoding parameters included in the entered setting signal.

Then, the encoding execution block 6 executes the encoding processing on the frame data 21 of the newly entered most recent image (step ST24).

The encoding execution block 6 encodes the frame data 21 of the most recent image under the newly set encoding parameters for example and adjusts the code amount so as to bring the code amount to a predetermined data amount.

The encoding execution block 6 outputs each encoded frame data 21.

Consequently, the moving image data taken by the imaging block 2 is encoded.

As described above, in the second embodiment, the mode management block 4 determines whether the imaging environment is dark or not on the basis of the imaging information indicative of the imaging environment sent from the imaging block 2.

Therefore, the mode management block 4 is able to determine the encoding mode without making decision by itself on the basis of the frame data 21.

Consequently, the time of determination by the mode management block 4 can be reduced. This allows the mode management block 4 to use more time for the encoding processing to be executed by the encoding execution block 6.

3. Third Embodiment

Configuration of an Imaging Apparatus 1

Figure 16:
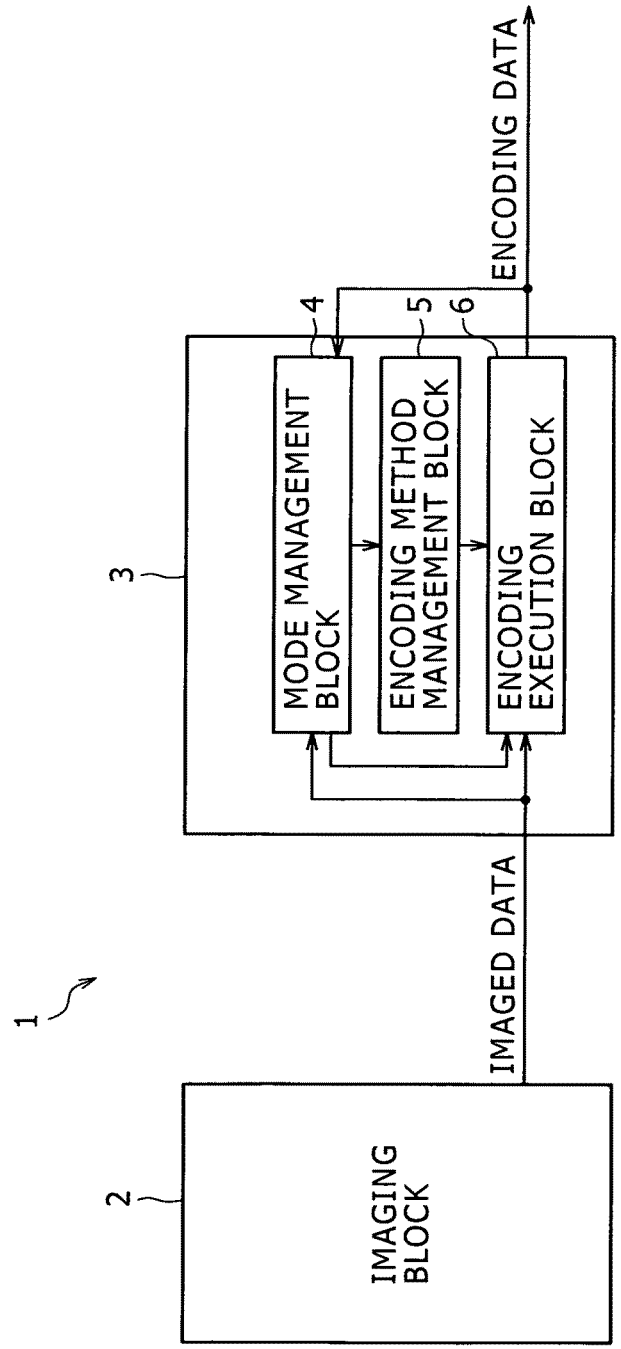
FIG. 16 is a schematic block diagram illustrating an imaging apparatus practiced as a third embodiment of the disclosure.

Referring to FIG. 16, there is shown a schematic diagram of an imaging apparatus 1 practiced as the third embodiment of the disclosure.

The imaging apparatus 1 shown in FIG. 16 has an imaging block 2 and an encoding block 3 connected to the imaging block 2.

The encoding block 3 has a mode management block 4, an encoding method management block 5, and an encoding execution block 6.

In the third embodiment, the mode management block 4 determines whether an image concerned is a dark image or not on the basis of the increase or decrease in the temporarily encoded frame data 21.

It should be noted that components of the third embodiment similar to the components of the first image are denoted by the same reference numerals for easy understanding of the disclosure.

The imaging block 2 continuously takes images and outputs a signal moving image data including two or more taken frame data 21.

The mode management block 4 is connected to the encoding execution block 6.

Next, on the basis of frame data 21 encoded by the encoding execution block 6, the mode management block 4 determines the imaging environment and outputs a mode signal.

For example, if encoding is executed under certain encoding parameters, a code amount (or a bit amount) of the frame data 21 of a dark image generally tends to increase over a code amount (or a bit amount) of the frame data 21 of a normal image.

Hence, the mode management block 4 determines whether the code amount of the frame data 21 encoded under certain encoding parameters is equal to or higher than the threshold value of a predetermined code amount.

If the code amount of the encoded frame data 21 is found to be equal to or higher than the predetermined threshold value, then the mode management block 4 determines that the imaging environment of the encoded frame data 21 is dark.

If the code amount of the encoded frame data 21 is found to be lower than the predetermined threshold value then the mode management block 4 determines that the imaging environment of the frame data 21 is normal in brightness.

The encoding method management block 5 is connected to the mode management block 4.

The encoding method management block 5 has two or more sets of encoding parameters for the operation modes of the encoding block 3.

On the basis of an entered mode signal and so on, the encoding method management block 5 selects one set of the encoding parameters.

The encoding method management block 5 outputs a setting signal of the selected encoding parameters.

The encoding execution block 6 is connected to the imaging block 2 and the encoding method management block 5.

On the basis of the entered setting signal, the encoding execution block 6 switches between encoding schemes.

The encoding execution block 6 encodes the moving image data entered from the imaging block 2 by use of the selected encoding scheme.

The above-mentioned sequence of operations allows the imaging apparatus 1 shown in FIG. 16 to determine whether an image concerned is a dark image on the basis of the increase or decrease in the data amount of the encoded frame data 21. If the image is found to be a dark image, then the imaging apparatus 1 switches the encoding parameters to those for dark images to encode the frame data 21.

The encoded moving image data is outputted from the encoding execution block 6.

Operation of the Imaging Apparatus 1

Referring to FIG. 17, there is shown a schematic block diagram illustrating the imaging apparatus 1 shown in FIG. 16.

In the imaging apparatus 1, the imaging block 2 starts imaging processing (step ST31).

The imaging block 2 repetitively outputs the frame data 21 of the taken image to the encoding block 3.

At the same time, the imaging block 2 generates imaging information about each generated frame data 21 and repetitively outputs the generated imaging information to the encoding block 3.

When the frame data 21 of the new most recent image is entered from the imaging block 2, the mode management block 4 outputs a signal for temporary encoding instruction to the encoding execution block 6 (step ST31).

The encoding execution block 6 executes the encoding processing with predetermined encoding parameters.

The encoding execution block 6 outputs the encoded frame data 21 or a code amount thereof to the mode management block 4.

The mode management block 4 of the encoding block 3 is connected to the encoding execution block 6.

On the basis of the code amount of the encoded frame data 21, the mode management block 4 determines the encoding mode (step ST33).

The mode management block 4 outputs a mode signal having the value of the determined mode to the encoding method management block 5.

When the mode signal is entered, the encoding method management block 5 selects an encoding scheme corresponding to the encoding mode determined by the mode management block 4 (step ST34).

The encoding method management block 5 outputs a setting signal of parameters for the selected encoding scheme to the encoding execution block 6.

When the encoding scheme parameter setting signal is entered, the encoding execution block 6 sets the encoding parameters included in the entered setting signal.

Next, the encoding execution block 6 executes the encoding processing on the frame data 21 encoded before under the updated encoding parameters (step ST35).

The encoding execution block 6 encodes the frame data 21 of the most recent image under the newly set encoding parameters for example and adjusts the code amount so as to bring the code amount to a predetermined data amount.

The encoding execution block 6 outputs each encoded frame data 21.

It should be noted that the encoding execution block 6 repeats the encoding processing twice or more until an optimum code amount or an optimum picture quality is obtained.

Consequently, the moving image data taken by the imaging block 2 is encoded.

As described above, in the third embodiment, the mode management block 4 determines whether the imaging environment is dark or not on the basis of the code amount of the frame data 21 temporarily encoded by the encoding execution block 6.

If a dark image is taken, the imaging block 2 outputs the frame data 21 taken with a frame rate lower than normal.

Therefore, if the encoding execution block 6 repeats the encoding processing on the same frame data 21 twice or more, the encoding block 3 is able to complete the encoding processing of each frame data 21 before the next frame data 21 is entered.

The encoding block 3 is able to encode all frame data 21 taken by the imaging block 2.

Namely, in the third embodiment, if no imaging information is obtained, the mode management block 4 temporarily executes the encoding of image data in advance and determines whether the image concerned is a dark image or not on the basis of the increase or decrease in a generated bit amount (or a code amount) of the encoded frame data 21. Consequently, the frame data 21 of each dark image can be properly encoded.

4. Fourth Embodiment

Configuration and Operation of a Monitoring System 51

Referring to FIG. 18, there is shown a schematic block diagram of the monitoring system 51 practiced as the fourth embodiment of the disclosure.

The monitoring system 51 shown in FIG. 18 encodes the dark frame data 21 by the same encoding scheme as that of the first embodiment and transmits the encoded dark frame data 21.

The monitoring system 51 shown in FIG. 18 has a first imaging apparatus 52, a second imaging apparatus 53, a monitoring apparatus 54, and a network 55 to which these apparatuses are connected.

The first imaging apparatus 52 has an imaging block 2, an encoding block 3, a first storage block 61, and a first communication block 62 connected to the network 55.

It should be noted that the configuration of the second imaging apparatus 53 is substantially the same as that of the first imaging apparatus 52 and therefore the description of the configuration of the second imaging apparatus 53 will be skipped.

The imaging block 2 continuously takes images and outputs a signal of moving image data including two or more frame data 21.

The encoding block 3 has the encoding execution block 6, the encoding method management block 5, and the mode management block 4.

The mode management block 4 determines the encoding mode on the basis of an imaging frame rate.

The encoding method management block 5 sets encoding parameters corresponding to the encoding mode determined by the mode management block 4 to the encoding execution block 6.

Under the set encoding parameters, the encoding execution block 6 encodes each frame data 21 taken by the imaging block 2.

The first storage block 61 is connected to the encoding block 3.

The first storage block 61 cumulatively stores the frame data 21 encoded by the encoding block 3.

Consequently, the first storage block 61 stores the moving image data based on two or more encoded frame data 21.

The first communication block 62 is connected to the encoding block 3 and the first storage block 61.

The first communication block 62 outputs the frame data 21 encoded by the encoding block 3 to the network 55.

Consequently, the frame data 21 of each realtime image is transmitted from the first imaging apparatus 52 to the monitoring apparatus 54.

In addition, the first communication block 62 outputs the encoded frame data 21 cumulatively stored in the first storage block 61 to the network 55.

Consequently, the frame data 21 of the past images is transmitted from the first imaging apparatus 52 to the monitoring apparatus 54.

The monitoring apparatus 54 has a second communication block 71 connected to the network 55, a second storage block 72, a decoding block 73, and a monitor 74.

The second communication block 71 receives, from the network 55, the encoded frame data 21 transmitted from the first imaging apparatus 52 or the second imaging apparatus 53.

The second storage block 72 is connected to the second communication block 71.

The second storage block 72 stores the encoded frame data 21 received by the second communication block 71.

Consequently, the second storage block 72 cumulatively stores the frame data 21 of the moving image data taken by the first imaging apparatus 52 or the second imaging apparatus 53.

The decoding block 73 is connected to the second communication block 71 and the second storage block 72.

The decoding block 73 decodes the encoded frame data 21 received by the second communication block 71.

The decoding block 73 also decodes the encoded frame data 21 stored in the second storage block 72.

The monitor 74 is connected to the decoding block 73.

The monitor 74 displays images on the basis of the frame data 21 decoded by the decoding block 73.

Consequently, the monitor 74 displays monitor images taken by the first imaging apparatus 52 or the second imaging apparatus 53 realtime or retrospectively.

As described above, in the fourth embodiment, the monitoring video taken by the first imaging apparatus 52 or the second imaging apparatus 53 can be displayed on the monitor 74 of the monitoring apparatus 54.

In addition, like the imaging apparatus 1 of the first embodiment, the encoding block 3 of the first imaging apparatus 52 and the second imaging apparatus 53 encodes the frame data 21 of each dark image on the basis of the suitable encoding parameters corresponding to the dark image.

Therefore, images having a picture quality higher than that of the frame data 21 encoded by normal encoding parameters are displayed on the monitor 74 of the monitoring apparatus 54.

While preferred embodiments of the present disclosure have been described using specific terms, such description is for illustrative purpose only, and it is to be understood that changes and variations may be made without departing from the spirit or scope of the following claims.

In addition, the above-mentioned embodiments of the disclosure can be appropriately combined each other or replaced.

For example, in the above-mentioned second embodiment, the imaging block 2 transmits an imaging information signal to the encoding block 3 in addition to the moving image data made up of two or more frame data 21.

Alternatively, the imaging block 2 may embed imaging information in moving image data and transmit the moving image data and the imaging information to the encoding block 3, for example.

In this case, the mode management block 4 may determine whether the imaging environment of each frame data 21 is dark or not on the basis of the imaging information embedded in the moving image data.

In each of the above-mentioned embodiments, each motion vector is fixed in encoding each dark image.

Alternatively, motion vector search may also be executed in the dark mode, for example.

In this case, the mode management block 4 of the third embodiment may determine whether the image concerned is a dark image or not on the basis of the motion vector used at the time of encoding the frame data 21 as an inter-frame instead of the code amount.

As compared with a normal image, a dark image tends to fluctuate in the direction or size of motion vector.

Hence, if the direction or size of motion vector fluctuates with a distribution equal to or greater than a predetermined value, the mode management block 4 can determine that the image concerned is a dark image.

Consequently, if the encoded frame data 21 is an inter-frame (a frame that is encoded by referencing another frame) for example, the mode management block 4 can determine whether the imaging is dark imaging or not on the basis of the fluctuation of motion vector. As compared with a normally bright image, a dark image tends to fluctuate in the motion vector due to image noise.

In the dark mode, the imaging frame rate is lower than normal and therefore frame intervals are wider.

Therefore, the direction of motion vector search may be switched from unidirectional to omnidirectional.

Thus, with each dark image, the frame intervals are wider than normal. Hence, if the mode management block 4 uses a scheme of switching the motion vector search of inter-frame from unidirectional to omnidirectional in the dark image encoding processing, the encoding processing of each desired frame can be completed within a frame rate period.

Further, the range in which motion vector reference is executed may be switched from the normal GOP to the range of all encoded frame data 21. Thus, with each dark image, the frame intervals are wider than normal. Hence, if the mode management block 4 employs a scheme for selectively switching the selection of a reference block for a dark image from among all blocks in the stored reference frame, the encoding processing of each desired frame can be completed within a frame rate period.

In each of the above-mentioned embodiments, the encoding method management block 5 sets the standard-compliant basic parameters such as GOP and, if the image concerned is dark, changes all parameters shown in FIG. 8.

Alternatively, if the image concerned is dark, the encoding method management block 5 may change at least one parameter among the parameters shown in FIG. 8, for example.

In each of the above-mentioned embodiments, the encoding block 3 switches the encoding schemes between the case where the frame data 21 of a dark image is encoded and the case where the frame data 21 of a normally bright image is encoded.

Alternatively, the encoding block 3 may switch the encoding schemes between three or more cases including the case where the frame data 21 of a dark frame is encoded, for example.

The above-mentioned first to third embodiments are examples of the imaging apparatus 1.

The imaging apparatus 1 may be a video camera, a DSC (Digital Still Camera), a broadcasting camera, a monitoring camera, or a web camera, for example.

It should be noted that the encoding block 3 and the imaging block 2 of these embodiments are applicable to any of electronic devices, such as a mobile phone, a game machine, a portable electronic book, a navigation apparatus, a computer apparatus, and a reproducing apparatus, for example, in addition to the imaging apparatus 1.

The encoding block 3 and the imaging block 2 may be used in separate electronic devices. In this case, the transmission of moving image data from the imaging block 2 to the encoding block 3 is realized by wired communication based on cables or by wireless communication.

The above-mentioned fourth embodiment is an example in which the imaging apparatus 1 of the first embodiment is used for the monitoring system 51.

Alternatively, the imaging apparatus 1 of the second embodiment or the imaging apparatus 1 of the third embodiment may be used for the monitoring system 51 of the fourth embodiment.

In the monitoring system 51, the imaging apparatus 1 and the monitoring apparatus 54 may transfer moving image data to each other in a wireless communication manner.

These imaging apparatus 1 and monitoring apparatus 54 are applicable to a broadcasting system, a home network system, and other imaging systems, in addition to the monitoring system 51.

The present disclosure contains subject matter related to that disclosed in Japanese Priority Patent Application JP 2010-146439 filed in the Japan Patent Office on Jun. 28, 2010, the entire content of which is hereby incorporated by reference.

What is claimed is:

1. An encoding apparatus, comprising:
an encoding execution block configured to encode image frames of moving image data based on a collection of encoding settings; and
a setting block configured to set values for the encoding settings such that
default values for the encoding settings are set when normal image frames are encoded, and
when a given image frame of the moving image data is darker than usual, a value of at least one of the encoding settings is changed from the default value to a dark image value such that a code amount of the given image frame upon being encoded using the dark image value is decreased as compared to using the default value,
wherein the encoding settings include an encoding frame rate setting,
when the encoding frame rate setting is set to the default value, the encoding execution block executes an encoding processing on the moving image data each encoding time interval regardless of respective input timings of image frames of the moving image data, and
when the value of the encoding frame rate setting is set to the dark image value, the encoding execution block executes the encoding processing on the moving image data based on the respective input timings of the image frames of the moving image data,
wherein the encoding settings include an encoding repetition setting,
when the encoding repetition setting is set to the default value and the encoding execution block executes the encoding processing on an image frame of the moving image data, the encoding execution block encodes the image frame only once, and
when the encoding repetition setting is set to the dark image value and the encoding execution block executes the encoding processing on an image frame of the moving image data, the encoding execution block is enabled to encode the image frame a plurality of times.

2. The encoding apparatus of claim 1,
wherein the encoding settings include an intra-/inter-frame setting,
when the intra-/inter-frame setting is set to the default value, the encoding execution block encodes the moving image data using both intra-frame encoding and inter-frame encoding, and
when the intra-/inter-frame setting is set to the dark image value, the encoding execution block encodes the moving image data using only intra-frame encoding.

3. The encoding apparatus of claim 1,
wherein the encoding settings include a quantization table setting,
when the quantization table setting is set to the default value, a first quantization table for specifying a cutting ratio for each frequency component of an image frame is used by the encoding execution block, and
when the quantization table setting is set to the dark image value, a second quantization table greater in high-frequency component cutting ratio than the first quantization table is used by the encoding execution block.

4. The encoding apparatus of claim 1,
wherein the encoding settings include a motion vector setting,
when the motion vector setting is set to the default value, the encoding execution block executes a motion vector search associated with an image frame to be encoded as an inter-frame, and
when the motion vector setting is set to the dark image value, the encoding execution block executes the encoding processing by fixing a motion vector.

5. The encoding apparatus of claim 1, further comprising:
a decision block configured to determine whether the respective image frames of the moving image data are darker than usual based on an imaging frame interval of the moving image data.

6. An imaging apparatus comprising:
an image sensor that converts incident light into moving image data that includes a stream of image frames; and
a video encoder that receives the moving image data from the imaging sensor and encodes the image frames based on a collection of encoding settings; and
a setting unit that sets values for the encoding settings such that:
default values for the encoding settings are set when normal image frames are encoded, and
when a given image frame of the moving image data is darker than usual, a value of at least one of the encoding settings is changed from the default value to a dark image value such that a code amount of the given image frame upon being encoded using the dark image value is decreased as compared to using the default value,
wherein the encoding settings include an encoding frame rate setting,
when the encoding frame rate setting is set to the default value, an encoding execution block executes an encoding processing on the moving image data each encoding time interval regardless of respective input timings of image frames of the moving image data, and
when the value of the encoding frame rate setting is set to the dark image value, the encoding execution block executes the encoding processing on the moving image data based on the respective input timings of the image frames of the moving image data, wherein the encoding settings include an encoding repetition setting, when the encoding repetition setting is set to the default value and the encoding execution block executes the encoding processing on an image frame of the moving image data, the encoding execution block encodes the image frame only once, and when the encoding repetition setting is set to the dark image value and the encoding execution block executes the encoding processing on an image frame of the moving image data, the encoding execution block is enabled to encode the image frame a plurality of times.

7. The encoding apparatus of claim 6, wherein the encoding settings include an intra-/inter-frame setting, when the intra-/inter-frame setting is set to the default value, the encoding execution block encodes the moving image data using both intra-frame encoding and inter-frame encoding, and when the intra-/inter-frame setting is set to the dark image value, the encoding execution block encodes the moving image data using only intra-frame encoding.

8. The encoding apparatus of claim 6, wherein the encoding settings include a quantization table setting, when the quantization table setting is set to the default value, a first quantization table for specifying a cutting ratio for each frequency component of an image frame is used by the encoding execution block, and when the quantization table setting is set to the dark image value, a second quantization table greater in high-frequency component cutting ratio than the first quantization table is used by the encoding execution block.

9. The encoding apparatus of claim 6, wherein the encoding settings include a motion vector setting, when the motion vector setting is set to the default value, the encoding execution block executes a motion vector search associated with an image frame to be encoded as an inter-frame, and when the motion vector setting is set to the dark image value, the encoding execution block executes the encoding processing by fixing a motion vector.

10. The encoding apparatus of claim 6, further comprising:

a decision block configured to determine whether the respective image frames of the moving image data are darker than usual based on an imaging frame interval of the moving image data.

11. An method of controlling a video encoder that encodes image frames of moving image data based on a collection of encoding settings, comprising:

encoding image frames of moving image data based on a collection of encoding settings: and setting values for the encoding settings such that default values for the encoding settings are set when normal image frames are encoded, and when a given image frame of the moving image data is darker than usual, a value of at least one of the encoding settings is changed from the default value to a dark image value such that a code amount of the given image frame upon being encoded using the dark image value is decreased as compared to using the default value, wherein the encoding settings include an encoding frame rate setting, when the encoding frame rate setting is set to the default value, execute an encoding processing on the moving image data each encoding time interval regardless of respective input timings of image frames of the moving image data, and when the value of the encoding frame rate setting is set to the dark image value, execute the encoding processing on the moving image data based on the respective input timings of the image frames of the moving image data, wherein the encoding settings include an encoding repetition setting, when the encoding repetition setting is set to the default value and executing the encoding processing on an image frame of the moving image data, encode the image frame only once, and when the encoding repetition setting is set to the dark image value and executing the encoding processing on an image frame of the moving image data, encode the image frame a plurality of times.

* * * * *